United States Patent
McCabe et al.

(10) Patent No.: US 10,254,393 B2
(45) Date of Patent: Apr. 9, 2019

(54) COVARIANCE MATRIX TECHNIQUE FOR ERROR REDUCTION

(71) Applicants: Denis Hugh McCabe, Fredericksburg, VA (US); James H. Africa, Jr., Fredericksburg, VA (US)

(72) Inventors: Denis Hugh McCabe, Fredericksburg, VA (US); James H. Africa, Jr., Fredericksburg, VA (US)

(73) Assignee: The United States of America as represented by the Secretary of the Navy

( * ) Notice: Subject to any disclaimer, the term of this patent is extended or adjusted under 35 U.S.C. 154(b) by 250 days.

(21) Appl. No.: 15/083,110

(22) Filed: Mar. 28, 2016

(65) Prior Publication Data

US 2017/0276783 A1     Sep. 28, 2017

(51) Int. Cl.
    G01S 13/72     (2006.01)
    G01S 7/295     (2006.01)

(52) U.S. Cl.
    CPC .......... *G01S 13/723* (2013.01); *G01S 7/2955* (2013.01)

(58) Field of Classification Search
    None
    See application file for complete search history.

(56) References Cited

U.S. PATENT DOCUMENTS 7,030,809 B2 * 4/2006 McCabe ............... G01S 13/723
                                                    342/195
7,884,754 B1   2/2011 Alouani et al. ............ 342/95

(Continued)

OTHER PUBLICATIONS

Chapter 6—Track while Scan Concepts, Jan. 18, 2000; downloaded from URL<https://web.archive.org/web/20000118065343/https://fas.org/man/dod-101/navy/docs/fun/part06.htm> on Jul. 30, 2018.*

(Continued)

*Primary Examiner* — J. E. Schoenholtz
(74) *Attorney, Agent, or Firm* — Gerhard W. Thielman, Esq.

(57) ABSTRACT

A method for filtering spatial error from a measurement vector is provided to correct for roll, pitch and yaw angular motion. The method includes the following operations: Establish an unstabilized body reference frame. Convert the measurement vector to an unstabilized state vector $x_U$ in the unstabilized body reference frame. Establish a stabilized East-North-Up (ENU) reference frame. Calculate an unstabilized pre-transform covariance matrix $M_U$ from position variance of the body reference frame. Measure roll, pitch and yaw in the body reference frame as respective angle values (r, p, w). Calculate a transform matrix T between the body reference frame and the ENU reference frame. Calculate a stabilized data vector $x_S = T x_U$ from the transform matrix and the unstabilized state vector. Calculate a measured angle error sensitivity matrix $M_A$ from the angle values. Calculate a tri-diagonal angle error component matrix $M_E$ with square values of angle variance of the body reference frame. Calculate a total error covariance matrix $P_S = M_A M_E M_A^T + T M_U T^T$. Calculate a Kalman gain matrix for current time k+1 as $K(k+1) = P(k+1|k) H^T [HP(k+1|k) H^T + P_S]^{-1}$, where P(k+1|k) is predicted gain covariance matrix from previous time k to the current time (k+1), and H is measurement Jacobian. Finally, apply the Kalman gain matrix to a predicted state estimate for correcting the measurement vector $x_m$.

4 Claims, 13 Drawing Sheets

(56) References Cited

U.S. PATENT DOCUMENTS 9,081,092 B1 * 7/2015 Friesel .................. G01S 13/726
2003/0210185 A1 * 11/2003 Hager .................... G01S 7/292
342/194

OTHER PUBLICATIONS

A. F. Genovese: "An Interacting Multiple Model Algorithm for Accurate State Estimation of Maneuvering Targets", Johns Hopkins *APL Technical Digest* 22, 4, 614-623 (2001). http://www.jhuapl.edu/techdigest/TD/td2204/Genovese.pdf.

W. D. Blair et al.: "Benchmark Problem for Radar Resource Allocation and Tracking Maneuvering Targets in the Presence of ECM", NSWCDD/TR-96/10 (1996). http://www.dtic.mil/dtic/tr/fulltext/u2/a286909.pdf.

G. A. Watson et al.: Benchmark Problem with a Multisensor Framework for Radar Resource Allocation . . . , NSWCDD TR-99/32 (1999).

* cited by examiner

COVARIANCE MATRIX TECHNIQUE FOR ERROR REDUCTION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to signal processing. In particular, the invention relates to error reduction during roll/pitch/yaw coordinate transformation using covariance matrices.

Modern combat systems comprise an ever-increasing number and diversity of sensors. The function of a sensor is to provide information, typically in the form of numerical values, of the quantity that sensor is designed to detect and measure. In spite of the wide types and diversities of the sensors in a modern combat system, they all possess one very important property in common, namely that they all report out measurement data that contains errors. These errors, while undesirable, are unavoidable due to many reasons, among which are the following two:

(a) Finite resolution of the measurement electronics.

(b) Impact of ambient temperature and humidity on the electronics.

The type of errors being referred to here are commonly referred to as "noise", meaning that the errors very randomly from one measurement to another. In one measurement, the value reported is slightly higher (positive error) than the true value and in the next, slightly lower (negative). Over the long term, the average error is zero, meaning that the sum of the positive and negative errors typically averages out to zero.

The particular sensor involved in providing exemplary embodiments operates with a component of every inertial navigation system on board every navigable vessel on the sea, in the air and also in space. This component is commonly known as the roll/pitch/yaw (r, p, w) angle measurement system. This system plays a critical role in all combat systems, including those that operate a radar transceiver. Consider a radar on board a combat ship. The sea represents an unstable environment because the ocean waves and currents cause the ship to toss about—i.e., to rotate about at least one of the ship's axes: longitudinal (stern-to-bow), lateral (starboard-to-port) and vertical (keel-to-deck).

Translations in the longitudinal, lateral and vertical axes are respectively called surge, sway and heave. Rotations about the longitudinal, lateral and vertical axes are respectively called roll, pitch and yaw. This motion can be quite severe under sufficiently high sea states. A radar on board that ship is also subject to the same rolling, pitching and yawing motion.

SUMMARY

Conventional radar filter methods yield disadvantages addressed by various exemplary embodiments of the present invention. These provide a method for more accurately modeling errors in data by transformation through roll/pitch/yaw angles. In addition to conventional spatial correction, the method includes measurement of roll, pitch and yaw in the body reference frame as respective angle values (r, p, w); calculation of a measured angle error sensitivity matrix $M_A$ from the angle values, as well as a tri-diagonal angle error component matrix $M_E$ with square values of angle variance of the body reference frame; incorporation of angle covariance $M_A M_E M_A^T$ into a total error covariance matrix; calculation of a Kalman gain matrix based on the total error covariance matrix, and applying the Kalman gain matrix to a predicted state estimate for correcting the measurement vector.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

The function of the radar is to provide data on the location of all ocean, airborne, space (and occasionally land) targets that are visible to the array. These data are input to tracking filters, which then yield estimates of the position and velocity of those targets, as well as possibly acceleration. These position and velocity estimates are typically not produced in the frame of reference associated with the radar. Instead, the tracking functions are typically carried out in the local stabilized frame of reference known as the East-North-Up (ENU) frame of reference. In order to order to perform tracking in the stabilized frame of reference the raw radar data must first be coordinate transformed from the unstabilized array frame of reference to the stabilized East-North-Up frame of reference.

Figure 1:
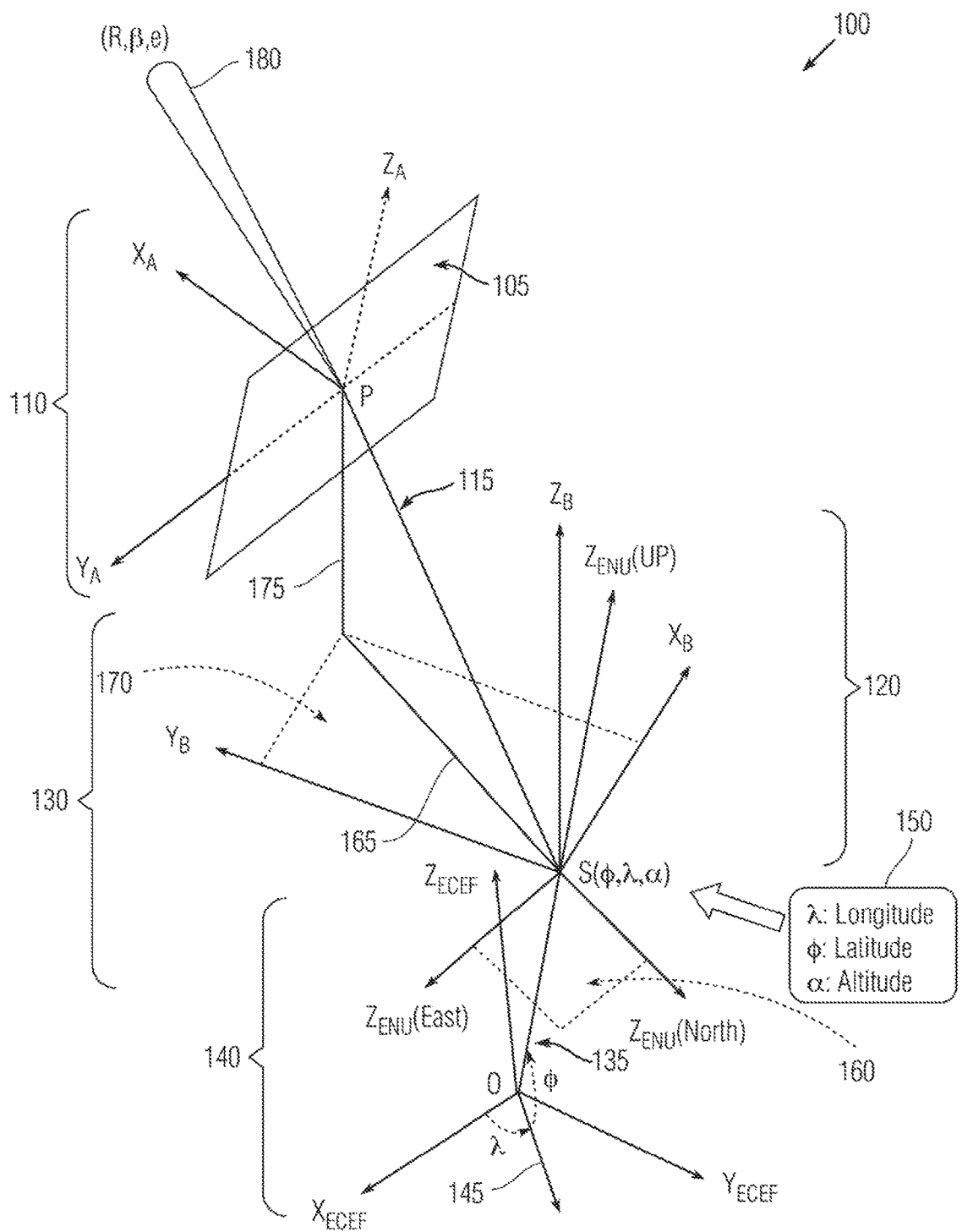
FIG. 1 is a vector diagram view of related sets of coordinates.

FIG. 1 provides a pictorial diagram view 100 of several frames of reference that are associated with a ship-borne radar system. A rectangular array face 105 (or plane) is defined by a local Array frame of reference 110 with origin P. An array lever arm 115 connects a ship's Body frame of reference 120 with origin S to the array frame 110. A stabilized East-North-Up (ENU) frame of reference 130 coincidentally shares origin S in this visual example. An ENU lever arm 135 connects an Earth-Centered-Earth-Fixed (ECEF) frame 140 with origin O to the ENU frame 130 with origin S. The ECEF frame 140 uses the World Geodetic System 1984 model (WGS-84).

The unstabilized local Array frame of reference 110 is indicated by orthogonal vector axes $(X_A, Y_A, Z_A)$. Its origin P corresponds to the end of the array lever arm 115 that extends to the unstabilized ship's Body frame of reference 120, indicated by axes $(X_B, Y_B, Z_B)$. The unstabilized Body frame 120 is oriented at angles (r, p, w) with respect to the local stabilized ENU frame of reference 130, indicated by axes $(X_{ENU}, Y_{ENU}, Z_{ENU})$. In this explanatory example, origin S of the Body frame 120 is shown as being coincident with the ENU frame 130 purely for mathematical convenience and without loss of generality. Their shared origin S corresponds to the end of the ENU lever arm 135 that extends to the ECEF frame of reference 140 indicated by axes $(X_{ECEF}, Y_{ECEF}, Z_{ECEF})$ having the origin O.

A planar ECEF vector 145 in the Earth horizontal plane forms a longitude angle λ from the $X_{ECEF}$ axis. The ENU vector 135 projects in azimuth by latitude angle φ from the ECEF vector 145. The origin S has a spatial displacement (λ, φ, α) from the origin O defined by coordinates 150. A local stabilized ENU tangent plane 160 at origin S forms from the $X_{ENU}$ and $Y_{ENU}$ axes. A body vector 165 from the origin S lies within a body horizontal plane 170 formed by the $X_B$ and $Y_B$ axes. A vertical vector 175 parallel to the $Z_B$ axis extends from the end of the body vector 165 to the origin P. A radar signal pencil beam 180 is emitted from the origin P of the array face 105. The radar beam 180 has vector coordinates (R, β, e) denoting range, bearing and elevation of the target, whose signal return can be detected by the radar.

The stabilized ENU frame of reference 130 is obtained from the Body frame of reference 120 by removing the instantaneously measured (r, p, w) angles from the Body coordinates. Thus even though the Body frame of reference 120 is rolling, pitching and yawing due to the ocean effects, the ENU frame of reference 130 removes these effects and is thus motionless.

While the Array and Body frames of reference 110 and 120 are associated with physical parts of the ship structure, the ENU frame of reference 130 is associated with the instantaneous latitude, longitude and altitude of some arbitrary reference point, such as the platform's own ship reference point (OSRP). The $X_{ENU}$ axis is tangential to the local line of latitude and points directly to the East. The $Y_{ENU}$ axis is tangential to the local line of longitude and points directly North. The $Z_{ENU}$ axis is orthogonal to the other two and points upward to form a right-hand frame of reference. The ENU frame of reference 130 is essentially a mathematical construct stabilized by removing from the Body frame of reference 120 the instantaneous (r, p, w) measured angles.

Prior to describing the algorithmic process, a list of arrays is provided to facilitate cross-referencing:

$M_A$ angular error sensitivity matrix in eqn. (25);

$M_B$ spatial error matrix in eqn. (26), equivalent to transform matrix T;

$M_C$ angular covariance matrix in eqn. (32), $M_E$ angle error component matrix in eqn. (30)—tri-diagonal square covariance matrix, $M_S$ post-transform covariance matrix in eqn. (33), $M_U$ pre-transform covariance matrix in eqn. (6), $P_S$ total error covariance matrix in eqn. (31), T transform matrix in eqn. (8), $x_m$ raw measurement data vector in eqn. (4), $x_S$ stabilized data vector in eqns. (7) and (12), $x_U$ unstabilized data vector in eqn. (5), $δ_A$ roll-pitch-yaw error vector from measurements from eqn. (28), $\delta_S$ stabilized error vector in eqns. (28) and (29), and
$\delta_U$ unstabilized data error vector from eqn. (28).

The series of steps to be executed to transform the data from the Array frame of reference 110 to the Body frame of reference 120 will be described. The subsequent step of transforming the data from the Body frame of reference 120 to the stabilized ENU frame of reference 130 constitutes the essence of exemplary embodiments and is described in detail later. The raw (noisy) radar measurement data ($R_m$, $\beta_m$, $e_m$) are generated in the radar frame of reference at origin P. These data are transformed into the antenna face rectangular frame of reference at the plane 105 for measurement data vector $x_m$ using the following transformation equations:

$$x_m = R_m \cos(e_m)\cos(\beta_m) \quad (1)$$

$$y_m = R_m \cos(e_m)\sin(\beta_m) \quad (2)$$

$$z_m = R_m \sin(e_m), \quad (3)$$

where ($x_m$, $y_m$, $z_m$) represent transformed measurement data Z(k) at each time step k in Cartesian space as the measurement data vector:

$$x_m = \begin{bmatrix} x_m \\ y_m \\ z_m \end{bmatrix} = \begin{bmatrix} R_m\cos(e_m)\cos(\beta_m) \\ R_m\cos(e_m)\sin(\beta_m) \\ R_m\sin(e_m) \end{bmatrix}. \quad (4)$$

A corresponding transformation is performed on the diagonal radar measurement covariance matrix to generate a measurement array covariance matrix in Cartesian coordinates corresponding to the transformed measurement data. The subscript m indicates data being with respect to the Array frame of reference 110.

These data are next transformed from the Array rectangular frame of reference 110 at the antenna to the (unstabilized) Body frame of reference 120 using conventional translation techniques (and rotation if the antenna face at the plane 105 has a tilt). These transformations are well known in the art. The data in the (unstabilized) Body frame of reference 120 can be designated as $x_U$, $y_U$ and $z_U$ by an unstabilized data vector:

$$x_U = \begin{bmatrix} x_U \\ y_U \\ z_U \end{bmatrix}. \quad (5)$$

The associated unstabilized pre-transform covariance matrix can be designated:

$$M_U = \begin{bmatrix} \sigma_{x_u}^2 & \sigma_{x_u y_u} & \sigma_{x_u z_u} \\ \sigma_{y_u x_u} & \sigma_{y_u}^2 & \sigma_{y_u z_u} \\ \sigma_{z_u x_u} & \sigma_{z_u y_u} & \sigma_{z_u}^2 \end{bmatrix}. \quad (6)$$

The unstabilized covariance matrix $M_U$ expresses the uncertainty that exists about the accuracy of the values appearing the data vector $x_U$. For example, $\sigma_{x_u}^2$ expresses the variance of the data value $x_U$, $\sigma_{y_u}^2$ expresses the variance of the data value $y_U$, etc. The off-diagonal terms ($\sigma_{x_u y_u}$, $\sigma_{x_u z_u}$) express the statistical correlation that exists between the term $x_U$ and the other terms $y_U$ and $z_U$ appearing in that data vector. This is the general relationship that exists between any covariance matrix and its associated unstabilized data vector.

Having described the transformation from the unstablized Array frame of reference 110 to the unstablized Body frame of reference 120, the principle aspect of the exemplary embodiments can be described, namely the transformation from the unstabilized Body frame of reference 120 to the stabilized ENU frame of reference 130. The next step is to transform the data vector $x_U$ and its associated unstabilized covariance matrix $M_U$ from the Body frame of reference 120 into the stabilized ENU frame of reference 130. This transformation is accomplished by using the unstable-to-stable transformation matrix T to yield the stabilized data vector $x_S = [x_S \ y_S \ z_S]^T$ in eqn. (7) as described in the following material.

This stabilization process is discussed in detail being of central importance to exemplary embodiments. Let $x_U = [x_U \ y_U \ z_U]^T$ represent a three-element vector in the unstabilized Body frame of reference 120 from eqn. (5). The unstabilized data vector $x_U$, say corresponding to the radar beam 180 having input measurements (R, $\beta$, e), is coordinate transformed into the stabilized ENU frame of reference 130. The stabilized data vector $x_S$ is obtained as follows:

$$x_S = \begin{bmatrix} x_S \\ y_S \\ z_S \end{bmatrix} = \quad (7)$$

$$\begin{bmatrix} \cos p \cos w & (\sin r \sin p \cos w - \cos r \sin w) & (\cos r \sin p \cos w + \sin r \sin w) \\ \cos p \sin w & (\sin r \sin p \sin w - \cos r \cos w) & (\cos r \sin p \sin w + \sin r \cos w) \\ -\sin p & \sin r \cos p & \cos r \cos p \end{bmatrix}$$

$$\begin{bmatrix} x_U \\ y_U \\ z_U \end{bmatrix} = \begin{bmatrix} T_{11} & T_{12} & T_{13} \\ T_{21} & T_{22} & T_{23} \\ T_{31} & T_{32} & T_{33} \end{bmatrix} \begin{bmatrix} x_U \\ y_U \\ z_U \end{bmatrix} = Tx_U,$$

where T is a 3×3 unstable-to-stable transformation matrix well known in the art and expressed as:

$$T = \quad (8)$$

$$\begin{bmatrix} \cos p \cos w & (\sin r \sin p \cos w - \cos r \sin w) & (\cos r \sin p \cos w + \sin r \sin w) \\ \cos p \sin w & (\sin r \sin p \sin w + \cos r \cos w) & (\cos r \sin p \sin w - \sin r \cos w) \\ -\sin p & \sin r \cos p & \cos r \cos p \end{bmatrix},$$

where quantities (r, p, w) represent noisy measured roll, pitch and yaw angles.

The transform elements correspond to their matrix array positions, such as $T_{11} = \cos p \cos w$, etc. As a result of these angle errors, the stabilized data vector $x_S = [x_S \ y_S \ z_S]^T$ has greater statistical uncertainty than it otherwise would have had the (r, p, w) angle measurements been perfect (i.e., with no errors). Exemplary embodiments accurately capture, in the form of an error covariance matrix, this increased uncertainty in the stabilized data vector $x_S$ as a function of the variances of the errors in the individual (r, p, w) angle measurements.

Obviously the larger the errors in the angles, the greater will be the uncertainty injected into the stabilized vector $x_S$. Recasting eqn. (7) provides a general functional form to simplify the subsequent mathematical analysis. From eqn. (7), the following elements can be represented:

$$x_S = T_{11}x_U + T_{12}y_U + T_{13}z_U \quad (9)$$
$$= g_{11}(r, p, w, x_U, y_U, z_U) + g_{12}(r, p, w, x_U, y_U, z_U) + g_{13}(r, p, w, x_U + y_U, z_U),$$

$$y_S = T_{21}x_U + T_{22}y_U + T_{23}z_U \quad (10)$$
$$= g_{21}(r, p, w, x_U, y_U, z_U) + g_{22}(r, p, w, x_U, y_U, z_U) + g_{23}(r, p, w, x_U, y_U, z_U),$$

and $$z_S = T_{31}x_U + T_{32}y_U + T_{33}z_U \quad (11)$$
$$g_{31}(r, p, w, x_U, y_U, z_U) + g_{32}(r, p, w, x_U, y_U, z_U) + g_{33}(r, p, w, x_U, y_U, z_U).$$

The errors in the stabilized data vector $x_S$ are obtained by the following series of partial derivatives of the $g_{ij}$ sensitivity functions that can be summarized merely for editorial convenience as:

$$x_S = \begin{bmatrix} T_{11} & T_{12} & T_{13} \\ T_{21} & T_{22} & T_{23} \\ T_{31} & T_{32} & T_{33} \end{bmatrix} \begin{bmatrix} x_U \\ y_U \\ z_U \end{bmatrix} = \begin{bmatrix} g_{11} + g_{12} + g_{13} \\ g_{21} + g_{22} + g_{23} \\ g_{31} + g_{32} + g_{33} \end{bmatrix} = \quad (12)$$

$$\begin{bmatrix} (\cos p \cos w)x_U + (\sin r \sin p \cos w - \cos r \sin w)y_U + \\ (\cos r \sin p \cos w + \sin r \sin w)z_U \\ (\cos p \sin w)x_U + (\sin r \sin p \sin w + \cos r \cos w)y_U + \\ (\cos r \sin p \sin w - \sin r \cos w)z_U \\ (-\sin p)x_U + (\sin r \cos p)y_U + (\cos r \cos p)z_U \end{bmatrix},$$

such that for each column i and row j, the terms can be defined as:

$$g_{11}(r,p,w,x_U,y_U,z_U) = T_{11}x_U = (\cos p \cos w)x_U, \quad (13)$$

$$g_{12}(r,p,w,x_U,y_U,z_U) = T_{12}y_U = (\sin r \sin p \cos w - \cos r \sin w)y_U, \quad (14)$$

$$g_{13}(r,p,w,x_U,Y_U,z_U) = T_{13}z_U = (\cos r \sin p \cos w + \sin r \sin w)z_U, \quad (15)$$

$$g_{21}(r,p,w,x_U,y_U,z_U) = T_{21}x_U = (\cos p \sin w)x_U, \quad (16)$$

$$g_{22}(r,p,w,x_U,y_U,z_U) = T_{22}y_U = (\sin r \sin p \sin w + \cos r \cos w)y_U, \quad (17)$$

$$g_{23}(r,p,w,x_U,y_U,z_U) = T_{23}z_U = (\cos r \sin p \sin w - \sin r \cos w)z_U, \quad (18)$$

$$g_{31}(r,p,w,x_U,y_U,z_U) = T_{31}x_U = (-\sin p)x_U, \quad (19)$$

$$g_{32}(r,p,w,x_U,y_U,z_U) = T_{32}y_U = (\sin r \cos p)y_U, \quad (20)$$

$$g_{33}(r,p,w,x_U,y_U,z_U) = T_{33}z_U = (\cos r \cos p)z_U. \quad (21)$$

Having defined the elements comprising the ($g_{11}$, $g_{12}$, ..., $g_{33}$) sensitivity terms, the relationship between the errors in the transformed or stabilized vector $x_S = [x_S \ y_S \ z_S]^T$ can be developed in terms of the errors in the unstabilized state estimate vector $x_U = [x_U \ y_U \ z_U]^T$. This relationship is determined in large measure by the partial derivatives of the quantities ($g_{11}$, $g_{12}$, ..., $g_{33}$) as will be explained.

Let an unstabilized error vector $\delta_U = [\Delta x_U \ \Delta y_U \ \Delta z_U]^T$ represent the errors in the unstabilized data vector $x_U$ that have been transformed from the Array frame of reference 110 to the Body frame of reference 120. The differences denote the errors in the unstabilized data vector $x_U$. Similarly, an angle error vector $\delta_A = [\Delta r \ \Delta p \ \Delta w]^T$ denotes roll, pitch and yaw measurement errors. The elements $\Delta r$, $\Delta p$ and $\Delta w$ denote roll, pitch and yaw angle errors, and $\Delta x_U$, $\Delta y_U$ and $\Delta z_U$ represent errors in the unstabilized data vector $x_U$ that arise from the frame transformation.

Error sources in the unstabilized data vector $x_U$ differ from sources that produce the (r, p, w) angle data errors. Thus, these spatial and angle errors can be treated as independent of each other. The unstabilized data errors are caused by several sources that include errors in the radar measurement themselves (e.g., $R_m$, $\beta_m$, $e_m$) along with the transformation from the array face 105 to the Body frame 120. These are accounted for in conventional system designs, and thus merit no further discussion in this disclosure. Instead, exemplary embodiments focus on compensating for the angle data errors.

From these relations, discrete differences from the stabilized data vector $x_S$ can be found for stabilized error vector $\delta_S = [\Delta x_S \ \Delta y_S \ \Delta z_S]^T$ expressed as separate elements that include angle error terms and translation error terms:

$$\Delta x_S = \frac{\partial g_{11}}{\partial r}\Delta r + \frac{\partial g_{11}}{\partial p}\Delta p + \frac{\partial g_{11}}{\partial w}\Delta w + \frac{\partial g_{11}}{\partial x_U}\Delta x_U + \quad (22)$$
$$\frac{\partial g_{11}}{\partial y_U}\Delta y_U + \frac{\partial g_{11}}{\partial z_U}\Delta z_U + \frac{\partial g_{12}}{\partial r}\Delta r + \frac{\partial g_{12}}{\partial p}\Delta p + \frac{\partial g_{12}}{\partial w}\Delta w +$$
$$\frac{\partial g_{12}}{\partial x_U}\Delta x_U + \frac{\partial g_{12}}{\partial y_U}\Delta y_U + \frac{\partial g_{12}}{\partial z_U}\Delta z_U + \frac{\partial g_{13}}{\partial r}\Delta r +$$
$$\frac{\partial g_{13}}{\partial p}\Delta p + \frac{\partial g_{13}}{\partial w}\Delta w + \frac{\partial g_{13}}{\partial x_U}\Delta x_U + \frac{\partial g_{13}}{\partial y_U}\Delta y_U + \frac{\partial g_{13}}{\partial z_U}\Delta z_U,$$

$$\Delta y_S = \frac{\partial g_{21}}{\partial r}\Delta r + \frac{\partial g_{21}}{\partial p}\Delta p + \frac{\partial g_{21}}{\partial w}\Delta w + \frac{\partial g_{21}}{\partial x_U}\Delta x_U + \quad (23)$$
$$\frac{\partial g_{21}}{\partial y_U}\Delta y_U + \frac{\partial g_{21}}{\partial z_U}\Delta z_U + \frac{\partial g_{22}}{\partial r}\Delta r + \frac{\partial g_{22}}{\partial p}\Delta p + \frac{\partial g_{22}}{\partial w}\Delta w +$$
$$\frac{\partial g_{22}}{\partial x_U}\Delta x_U + \frac{\partial g_{22}}{\partial y_U}\Delta y_U + \frac{\partial g_{22}}{\partial z_U}\Delta z_U + \frac{\partial g_{23}}{\partial r}\Delta r +$$
$$\frac{\partial g_{23}}{\partial p}\Delta p + \frac{\partial g_{23}}{\partial w}\Delta w + \frac{\partial g_{23}}{\partial x_U}\Delta x_U + \frac{\partial g_{23}}{\partial y_U}\Delta y_U + \frac{\partial g_{23}}{\partial z_U}\Delta z_U,$$

and $$\Delta z_S = \frac{\partial g_{31}}{\partial r}\Delta r + \frac{\partial g_{31}}{\partial p}\Delta p + \frac{\partial g_{31}}{\partial w}\Delta w + \frac{\partial g_{31}}{\partial x_U}\Delta x_U + \quad (24)$$
$$\frac{\partial g_{31}}{\partial y_U}\Delta y_U + \frac{\partial g_{31}}{\partial z_U}\Delta z_U + \frac{\partial g_{32}}{\partial r}\Delta r + \frac{\partial g_{32}}{\partial p}\Delta p + \frac{\partial g_{32}}{\partial w}\Delta w +$$
$$\frac{\partial g_{32}}{\partial x_U}\Delta x_U + \frac{\partial g_{32}}{\partial y_U}\Delta y_U + \frac{\partial g_{32}}{\partial z_U}\Delta z_U + \frac{\partial g_{33}}{\partial r}\Delta r +$$
$$\frac{\partial g_{33}}{\partial p}\Delta p + \frac{\partial g_{33}}{\partial w}\Delta w + \frac{\partial g_{33}}{\partial x_U}\Delta x_U + \frac{\partial g_{33}}{\partial y_U}\Delta y_U + \frac{\partial g_{33}}{\partial z_U}\Delta z_U,$$

where the ($g_{11}$, $g_{12}$, ..., $g_{33}$) sensitivity terms are partially differentiated against respective roll, pitch and yaw angles.

The partial derivatives of the sensitivity terms can be expressed in matrix form for the angular terms as:

$$M_A = \begin{bmatrix} \left(\frac{\partial g_{11}}{\partial r} + \frac{\partial g_{12}}{\partial r} + \frac{\partial g_{13}}{\partial r}\right) & \left(\frac{\partial g_{11}}{\partial p} + \frac{\partial g_{12}}{\partial p} + \frac{\partial g_{13}}{\partial p}\right) & \left(\frac{\partial g_{11}}{\partial w} + \frac{\partial g_{12}}{\partial w} + \frac{\partial g_{13}}{\partial w}\right) \\ \left(\frac{\partial g_{21}}{\partial r} + \frac{\partial g_{22}}{\partial r} + \frac{\partial g_{23}}{\partial r}\right) & \left(\frac{\partial g_{21}}{\partial p} + \frac{\partial g_{22}}{\partial p} + \frac{\partial g_{23}}{\partial p}\right) & \left(\frac{\partial g_{21}}{\partial w} + \frac{\partial g_{22}}{\partial w} + \frac{\partial g_{23}}{\partial w}\right) \\ \left(\frac{\partial g_{31}}{\partial r} + \frac{\partial g_{32}}{\partial r} + \frac{\partial g_{33}}{\partial r}\right) & \left(\frac{\partial g_{31}}{\partial p} + \frac{\partial g_{32}}{\partial p} + \frac{\partial g_{33}}{\partial p}\right) & \left(\frac{\partial g_{31}}{\partial w} + \frac{\partial g_{32}}{\partial w} + \frac{\partial g_{33}}{\partial w}\right) \end{bmatrix}, \quad (25)$$

and for the spatial error reference frame translation as:

$$M_B = \begin{bmatrix} \left(\frac{\partial g_{11}}{\partial x_U} + \frac{\partial g_{12}}{\partial x_U} + \frac{\partial g_{13}}{\partial x_U}\right) & \left(\frac{\partial g_{11}}{\partial y_U} + \frac{\partial g_{12}}{\partial y_U} + \frac{\partial g_{13}}{\partial y_U}\right) & \left(\frac{\partial g_{11}}{\partial z_U} + \frac{\partial g_{12}}{\partial z_U} + \frac{\partial g_{13}}{\partial z_U}\right) \\ \left(\frac{\partial g_{21}}{\partial x_U} + \frac{\partial g_{22}}{\partial x_U} + \frac{\partial g_{23}}{\partial x_U}\right) & \left(\frac{\partial g_{21}}{\partial y_U} + \frac{\partial g_{22}}{\partial y_U} + \frac{\partial g_{23}}{\partial y_U}\right) & \left(\frac{\partial g_{21}}{\partial z_U} + \frac{\partial g_{22}}{\partial z_U} + \frac{\partial g_{23}}{\partial z_U}\right) \\ \left(\frac{\partial g_{31}}{\partial x_U} + \frac{\partial g_{32}}{\partial x_U} + \frac{\partial g_{33}}{\partial x_U}\right) & \left(\frac{\partial g_{31}}{\partial y_U} + \frac{\partial g_{32}}{\partial y_U} + \frac{\partial g_{33}}{\partial y_U}\right) & \left(\frac{\partial g_{31}}{\partial z_U} + \frac{\partial g_{32}}{\partial z_U} + \frac{\partial g_{33}}{\partial z_U}\right) \end{bmatrix}, \quad (26)$$

Upon evaluation of the partial derivatives in eqn. (26), the spatial error matrix $M_B$ is found to be identical to the unstable-to-stable transformation matrix T in eqn. (8) such that:

$$M_B = T. \quad (27)$$

Recasting eqns. (22) through (24) in matrix form using eqns. (25) through (27) yields the stabilized error vector $\delta_S = [\Delta x_S \; \Delta y_S \; \Delta z_S]^T$:

$$\delta_S = \begin{bmatrix} \Delta x_S \\ \Delta y_S \\ \Delta z_S \end{bmatrix} = M_A \delta_A + T\delta_U = M_A \begin{bmatrix} \Delta r \\ \Delta p \\ \Delta w \end{bmatrix} + T \begin{bmatrix} \Delta x_U \\ \Delta y_U \\ \Delta z_U \end{bmatrix}, \quad (28)$$

where $\delta_A = [\Delta r \; \Delta p \; \Delta w]^T$ is the vector of errors in the (r, p, w) data, and $\delta_U = [\Delta x_U \; \Delta y_U \; \Delta z_U]^T$ is the vector of errors in the input unstabilized state vector $x_U = [x_U \; y_U \; z_U]^T$. Exemplary embodiments provide for correction to correspond to eqn. (26) for the stabilized error vector $\delta_S$, namely angle error sensitivity matrix $M_A$ from eqn. (25), and the correction can be expanded to:

$$\delta_S = \begin{bmatrix} \Delta x_S \\ \Delta z_S \\ \Delta z_S \end{bmatrix} = \quad (29)$$

$$\begin{bmatrix} \left(\frac{\partial g_{11}}{\partial r} + \frac{\partial g_{12}}{\partial r} + \frac{\partial g_{13}}{\partial r}\right) & \left(\frac{\partial g_{11}}{\partial p} + \frac{\partial g_{12}}{\partial p} + \frac{\partial g_{13}}{\partial p}\right) & \left(\frac{\partial g_{11}}{\partial w} + \frac{\partial g_{12}}{\partial w} + \frac{\partial g_{13}}{\partial w}\right) \\ \left(\frac{\partial g_{21}}{\partial r} + \frac{\partial g_{22}}{\partial r} + \frac{\partial g_{23}}{\partial r}\right) & \left(\frac{\partial g_{21}}{\partial p} + \frac{\partial g_{22}}{\partial p} + \frac{\partial g_{23}}{\partial p}\right) & \left(\frac{\partial g_{21}}{\partial w} + \frac{\partial g_{22}}{\partial w} + \frac{\partial g_{23}}{\partial w}\right) \\ \left(\frac{\partial g_{31}}{\partial r} + \frac{\partial g_{32}}{\partial r} + \frac{\partial g_{33}}{\partial r}\right) & \left(\frac{\partial g_{31}}{\partial p} + \frac{\partial g_{32}}{\partial p} + \frac{\partial g_{33}}{\partial p}\right) & \left(\frac{\partial g_{31}}{\partial w} + \frac{\partial g_{32}}{\partial w} + \frac{\partial g_{33}}{\partial w}\right) \end{bmatrix} \begin{bmatrix} \Delta r \\ \Delta p \\ \Delta w \end{bmatrix} +$$

$$\begin{bmatrix} \left(\frac{\partial g_{11}}{\partial x_U} + \frac{\partial g_{12}}{\partial x_U} + \frac{\partial g_{13}}{\partial x_U}\right) & \left(\frac{\partial g_{11}}{\partial y_U} + \frac{\partial g_{12}}{\partial y_U} + \frac{\partial g_{13}}{\partial y_U}\right) & \left(\frac{\partial g_{11}}{\partial z_U} + \frac{\partial g_{12}}{\partial z_U} + \frac{\partial g_{13}}{\partial z_U}\right) \\ \left(\frac{\partial g_{21}}{\partial x_U} + \frac{\partial g_{22}}{\partial x_U} + \frac{\partial g_{23}}{\partial x_U}\right) & \left(\frac{\partial g_{21}}{\partial y_U} + \frac{\partial g_{22}}{\partial y_U} + \frac{\partial g_{23}}{\partial y_U}\right) & \left(\frac{\partial g_{21}}{\partial z_U} + \frac{\partial g_{22}}{\partial z_U} + \frac{\partial g_{23}}{\partial z_U}\right) \\ \left(\frac{\partial g_{31}}{\partial x_U} + \frac{\partial g_{32}}{\partial x_U} + \frac{\partial g_{33}}{\partial x_U}\right) & \left(\frac{\partial g_{31}}{\partial y_U} + \frac{\partial g_{32}}{\partial y_U} + \frac{\partial g_{33}}{\partial y_U}\right) & \left(\frac{\partial g_{31}}{\partial z_U} + \frac{\partial g_{32}}{\partial z_U} + \frac{\partial g_{33}}{\partial z_U}\right) \end{bmatrix} \begin{bmatrix} \Delta x_U \\ \Delta y_U \\ \Delta z_U \end{bmatrix}.$$

Before describing the total error covariance matrix $P_S$ of the stabilized data vector $x_S$, there are two distinct constituent covariance matrices to mention. First, the linear pre-transform covariance matrix $M_U$ from eqn. (6) represents the uncertainties in the unstabilized data vector $x_U$ prior to its transformation to the stabilized ENU frame of reference 130. As mentioned previously, this covariance matrix $M_U$ results from several sources of errors during the process of transforming the radar measurement data (R, β, e) from the Array frame of reference 110 to the Body frame of reference 120.

Second, an angle error component matrix $M_E$ based on the tri-diagonal standard deviation errors can be expressed as:

$$M_E = \begin{bmatrix} \sigma_r^2 & 0 & 0 \\ 0 & \sigma_p^2 & 0 \\ 0 & 0 & \sigma_w^2 \end{bmatrix}, \quad (30)$$

where $\sigma_r^2$, $\sigma_p^2$ and $\sigma_w^2$ respectively express the variances of roll, pitch and yaw. Thus, the angle error component matrix $M_E$ expresses the uncertainty that exists about the accuracy of roll, pitch and yaw (r, p, w) angle measurements. These diagonal terms represent components arising from the additional uncertainty generated by the errors in the measured (r, p, w) angle data during the transformation in eqn. (7). Exemplary embodiments provide techniques to determine the numerous expressions that comprise the elements of the angle error sensitivity matrix $M_A$ provided in eqn. (25).

From the differential errors in eqn. (28), the total error covariance matrix $P_S$ of the stabilized data vector $x_S$ is given by:

$$P_S = \qquad (31)$$

$$M_A \begin{bmatrix} \sigma_r^2 & 0 & 0 \\ 0 & \sigma_p^2 & 0 \\ 0 & 0 & \sigma_w^2 \end{bmatrix} M_A^T + T \begin{bmatrix} \sigma_{x_U}^2 & \sigma_{x_U}\sigma_{y_U} & \sigma_{x_U}\sigma_{z_U} \\ \sigma_{y_U}\sigma_{x_U} & \sigma_{y_U}^2 & \sigma_{y_U}\sigma_{z_U} \\ \sigma_{z_U}\sigma_{x_U} & \sigma_{z_U}\sigma_{y_U} & \sigma_{z_U}^2 \end{bmatrix} T^T =$$

$$M_A M_E M_A^T + T M_U T^T = E\{\delta_S \delta_S^T\},$$

where E is the expectation value of the statistical average of the stabilized error vector. Separation of the angular and coordinate error terms is based on the reasonable assumption that the (r, p, w) measurement errors from the first term $M_A M_E M_A^T$ are statistically independent of each other and of the errors in the Array-to-Body transformations from the second term $TM_U T^T$.

For the first term, an angular covariance matrix $M_C$ for angular error can be defined for convenience as:

$$M_C = M_A \begin{bmatrix} \sigma_r^2 & 0 & 0 \\ 0 & \sigma_p^2 & 0 \\ 0 & 0 & \sigma_w^2 \end{bmatrix} M_A^T = M_A M_E M_A^T, \qquad (32)$$

where angular sensitivity matrix $M_A$ is provided in eqn. (25), and angle error component matrix $M_E$ is provided in eqn. (30).

For the second term, a post-transform covariance matrix $M_S$ for linear error is expressed as:

$$M_S = T \begin{bmatrix} \sigma_{x_U}^2 & \sigma_{x_U}\sigma_{y_U} & \sigma_{x_U}\sigma_{z_U} \\ \sigma_{y_U}\sigma_{x_U} & \sigma_{y_U}^2 & \sigma_{y_U}\sigma_{z_U} \\ \sigma_{z_U}\sigma_{x_U} & \sigma_{z_U}\sigma_{y_U} & \sigma_{z_U}^2 \end{bmatrix} T^T = TM_U T^T, \qquad (3)$$

where unstabilized pre-transform covariance matrix $M_U$ is provided in eqn. (6). The unstabilized linear spatial error correlation matrix $M_B = T$ from eqn. (27) operates on a standard deviation pre-transform covariance matrix $M_U$ from eqn. (6). The expression in eqn. (33) represents the standard deviation covariance after it has been transformed into the stabilized ENU frame of reference 130. Alternatively stated, this post-transform covariance matrix $M_S$ represents that component of the stabilized vector $x_S$ that contributes to components in the total covariance matrix $P_S$ arising from the errors in the Array-to-Body frame transformation process.

Using the definitions of $(g_{11}, g_{12}, \ldots, g_{33})$ given in eqns. (13) through (21), one determines upon taking the several partial derivatives that angle error sensitivity matrix $M_A$ from eqn. (25) is comprised of the following elements:

$$M_A(1, 1) = \left(\frac{\partial g_{11}}{\partial r} + \frac{\partial g_{12}}{\partial r} + \frac{\partial g_{13}}{\partial r}\right) \qquad (34)$$
$$= (\cos r \sin p \cos w + \sin r \sin w) y_U + (-\sin r \sin p \cos w + \cos r \sin w) z_U,$$

$$M_A(1, 2) = \left(\frac{\partial g_{11}}{\partial p} + \frac{\partial g_{12}}{\partial p} + \frac{\partial g_{13}}{\partial p}\right) \qquad (35)$$
$$= (-\sin p \cos w) x_U + (\sin r \cos p \cos w) y_U + (\cos r \cos p \cos w) z_U,$$

$$M_A(1, 3) = \left(\frac{\partial g_{11}}{\partial w} + \frac{\partial g_{12}}{\partial w} + \frac{\partial g_{13}}{\partial w}\right) \qquad (36)$$
$$= (-\cos p \sin w) x_U + (-\sin r \sin p \sin w - \cos r \cos w) y_U + (-\cos r \sin p \sin w + \sin r \cos w) z_U,$$

$$M_A(2, 1) = \left(\frac{\partial g_{21}}{\partial r} + \frac{\partial g_{22}}{\partial r} + \frac{\partial g_{23}}{\partial r}\right) \qquad (37)$$
$$= (\cos r \sin p \sin w - \sin r \cos w) y_U + (-\sin r \sin p \sin w - \cos r \cos w) z_U,$$

$$M_A(2, 2) = \left(\frac{\partial g_{21}}{\partial p} + \frac{\partial g_{22}}{\partial p} + \frac{\partial g_{23}}{\partial p}\right) \qquad (38)$$
$$= (-\sin p \sin w) x_U + (\sin r \cos p \sin w) y_U + (\cos r \cos p \sin w) z_U,$$

$$M_A(2, 3) = \left(\frac{\partial g_{21}}{\partial w} + \frac{\partial g_{22}}{\partial w} + \frac{\partial g_{23}}{\partial w}\right) \qquad (39)$$
$$= (\cos p \cos w) x_U + (\sin r \sin p \cos w - \cos r \sin w) y_U + (\cos r \sin p \cos w + \sin r \sin w) z_U,$$

$$M_A(3, 1) = \left(\frac{\partial g_{31}}{\partial r} + \frac{\partial g_{32}}{\partial r} + \frac{\partial g_{33}}{\partial r}\right) \qquad (40)$$
$$= (\cos r \cos p) y_U + (-\sin r \cos p) z_U,$$

$$M_A(3, 2) = \left(\frac{\partial g_{31}}{\partial p} + \frac{\partial g_{32}}{\partial p} + \frac{\partial g_{33}}{\partial p}\right) \qquad (41)$$
$$= (-\cos p) x_U + (-\sin r \sin p) y_U + (-\cos r \sin p) z_U,$$

and $$M_A(3, 3) = \left(\frac{\partial g_{31}}{\partial w} + \frac{\partial g_{32}}{\partial w} + \frac{\partial g_{33}}{\partial w}\right) = 0. \qquad (42)$$

Having derived the elements of the angle error sensitivity matrix $M_A$ in eqn. (25), the exemplary angle covariance matrix $M_C$ in eqn. (32) can now be computed for given measured angle values of (r, p, w) and standard deviations ($\sigma_r$, $\sigma_p$, $\sigma_w$). This accounts for the roll/pitch/yaw measurement errors to enable presentation of the tracking of a maneuvering target from noisy radar data. Next, one can examine the improvement in tracking metrics afforded by incorporating this covariance matrix in a conventional tracking algorithm. The quality of the tracking metrics can be compared for the exemplary covariance matrix being turned "OFF" versus the same metrics for the exemplary covariance matrix being turned "ON" to demonstrate the advantages in estimation state for the exemplary latter condition. To understand how the exemplary embodiments are incorporated into a conventional tracking filter to achieve the inventive advantages, the several matrix difference equations that characterize the Kalman filter algorithm are reviewed and discussed to identify how the exemplary angle covariance matrix $M_C$ is inserted in these equations.

A conventional Kalman filter in an IMM architecture can be used for processing the noisy radar data to estimate the position and velocity of a target in three dimensions. The set of matrix difference equations that constitutes the widely-used Kalman filter is presented as follows. The Extended Kalman filter is used when the measurements are a nonlinear function of the states being estimated. The equations governing the Extended Kalman filter, and the order in which they are executed, are presented as a prediction step:

$$\hat{X}((k+1|k) = \Phi \hat{X}((k|k) \qquad (43)$$

and $P(k+1|k) = \Phi P(k|k)\Phi^T Q,$ (44)

where the matrix terms are defined as: $\Phi$ is the dynamic motion model of the target being used in the filter, such as a "constant velocity" model. $\hat{X}(k+1|k)$ is the predicted state estimate from the time k of the previous radar measurement to the time (k+1) of the current radar measurement based on the previous $\hat{X}(k|k)$ updated state estimate. $P(k+1|k)$ is the predicted covariance matrix from the previous time k to the current time (k+1) based on the $P(k|k)$ covariance matrix at the previous time. Q is the system process noise. The "caret" symbol ^ is the commonly accepted manner for designating an estimated value as distinct from a measured value.

This is followed by a measurement update step:

$$K(k+1)=P(k+1|k)H^T[HP(k+1|k)H^T+R]^{-1}, \quad (45)$$

$$P(k+1|k+1)=[I-K(k+1)H]P(k+1|k), \quad (46)$$

$$\text{and } \hat{X}(k+1|k+1)=\hat{X}(k+1|k)+K(k+1)[Z(k+1)-H\hat{X}(k+1|k)], \quad (47)$$

where $K(k+1)$ is the Kalman gain matrix (described later) for the current time, the measurement matrix H is the Jacobian of the nonlinear measurements expanded about the values of the predicted state $\hat{X}(k+1|k)$, and I is the identity matrix. The Kalman gain matrix K is important to the accuracy of the estimates (and covariance matrix) yielded by the algorithm. These relations are well-known to an artisan of ordinary skill in tracking and estimation. In the nomenclature, $\hat{X}(k+1|k+1)$ refers to the estimate obtained by optimally combining the predicted estimate with the radar measurement data vector $Z_m(k+1)$. This estimate is valid at current time (k+1). This constitutes standard nomenclature for the Kalman filter algorithm and would be familiar to artisans of ordinary skill in Kalman filter estimation.

The two prediction-step relations in eqns. (43) and (44) compute the state estimates and covariance, respectively, at the time of the next measurement. The measurement update step in eqns. (45)-(47) includes optimally combining these predicted estimates with the new measurement data. The first step in the measurement update process operates using eqn. (45) for Kalman gain. The inverse term therein can be expressed as:

$$M_R = HP(k+1|k)H^T+R, \quad (48)$$

so that eqn. (45) can be alternatively expressed as:

$$K(k+1)=P(k+1|k)H^T M_R^{-1}. \quad (49)$$

The covariance matrix R appearing in the matrix inverse term of eqn. (48) is the covariance matrix of the stabilized measurement data. This modified covariance matrix constitutes the subject of these exemplary embodiments. By more accurately modeling the covariance matrix R as follows:

$$R=P_S=M_A M_E M_A^T + TM_U T^T, \quad (50)$$

from eqn. (31) and hence replacing its conventional formulation, the estimates produced by the Kalman filter using the stabilized radar measurement data are superior over those in the absence (i.e., omission) of the exemplary covariance matrix $M_A M_E M_A^T$ from eqn. (32) as a matrix term in eqn. (50) incorporated in eqn. (45) for Kalman gain. Indeed the subsequent plots in FIGS. 3, 4, 7, 8, 12, 13, 16 and 17 provide a dramatic illustration of this by superimposing on each single graph two plots—one showing the position or velocity estimates when the exemplary covariance matrix is omitted (turned OFF) and the second showing the estimates when the exemplary covariance matrix is included (turned ON).

Concluding the discussion of the Kalman filter relations, the Kalman gain matrix is then used in the following pair of matrix difference equations:

$$P(k+1|k+1)=[I-K(k+1)H]P(k+1|k) \quad (51)$$

$$\text{and } \hat{X}((k+1|k+1)=\hat{X}(k+1|k)+K(k+1)[Z(k+1)-H\hat{X}(k+1|k)], \quad (52)$$

to produce the updated covariance matrix and updated estimates, respectively, the latter being shown in the drawings, as subsequently described. When the measurement update step is complete, the entire cycle repeats itself for the next measurement data.

Exemplary embodiments involve techniques to more accurately model the statistical uncertainty of noisy measurements data prior to their use in a tracking filter. Therefore the embodiments apply to all varieties of tracking filters such as:

Alpha-Beta filter—two-dimensional steady-state with constant gain.

Single Kalman tracking filter.

Multiple model tracking filter architecture using a maneuver detector.

Other multiple model tracking filter architectures such as the Interacting Multiple Model (IMM) architecture.

Before discussing the results below, the following disclaimer is of the utmost importance. In the subsequent discussions the terms "high noise" and "low noise" are used. These terms are used as terms of convenience to indicate relative noise values in the several simulation results presented. These should not be interpreted as being representative of the capabilities of actual deployed sensor systems. The objective in this description is simply to vary the noise over a wide range of values.

Performance Improvement Using Exemplary Covariance Matrix: To examine the performance improvement to be gained by employing the exemplary technique the IMM architecture is selected as the vehicle by which this improvement is demonstrated. The IMM is widely-accepted as a tracking filter architecture, serving as an ideal platform for demonstration. This technique is explained in a reference by A. F. Genovese: "The Interacting Multiple Model Algorithm for Accurate State Estimation of Maneuvering Targets", *APL Technical Digest* 22 (4) 614-623 (2001).

The following demonstrations use several of the NSWC Benchmark Trajectories that have become the widely-accepted trajectories against which to evaluate individual tracking filter performances. Performances are evaluated using graphical plots of tracking metrics. For those not skilled in the art, the following brief discussion explains what tracking metrics represent, their mathematical definitions, and how they provide an unambiguous and consistent measure of tracking filter performance over a wide set of scenarios.

Tracking metrics: The purpose of a tracking filter is to process the noisy radar position measurement data of a maneuvering target in three dimensions through a sophisticated algorithm, to estimate the position and velocity (and possibly acceleration) of that target. The focus on position and velocity estimation is accomplished without loss of generality as the discussion is equally applicable to acceleration estimation.

In any tracking filter algorithm the estimates produced by the filter are preferred to be "close" to the ground truth values (within some acceptable error). The closer the estimates are to the corresponding ground truth values, the better the tracking performance. In arriving at accurate estimates of position and velocity the filter must reduce the effect of the noise on the input measurement data. By yielding an improved statistical characterization of the input noisy measurement data through incorporation of the exemplary angle covariance matrix $M_C = M_A M_E M_A^T$ from eqn. (32) into total covariance matrix $P_S$ from eqn. (31), the exemplary technique will be shown to yield superior and indeed robust tracking filter performance compared to circumstances of the omission of this exemplary covariance matrix.

To provide a basis for comparing tracking performance between different scenarios, the commonly-accepted root squared error (RSE) can be used to assign a numerical value to tracking filter accuracy and performance for any given scenario. The RSE metric is computed as follows at input data time stamp $t_j$ of the trajectory:

$$\varepsilon_i(t_j) \equiv \sqrt{\left[\hat{x}(t_j) - x(t_j)_{gt}\right]^2 + \left[\hat{y}(t_j) - y(t_j)_{gt}\right]^2 + \left[\hat{z}(t_j) - z(t_j)_{gt}\right]^2}, \quad (53)$$

where the "caret" (^) signifies the estimated value and the subscript gt signifies the ground truth value. The terms (x, y, z) refer to the three orthogonal coordinate directions in the ENU frame of reference 130. The subscript i refers to the particular Monte Carlo run currently being executed. Monte Carlo runs are employed to yield average tracking filter performance metrics over many runs. The squared value is used in eqn. (53) to avoid the possibility of a large negative error adding to a large positive error to yield the erroneous impression of a very small error. This squaring and adding is performed to obtain the total error metric in three-dimensional space. A similar metric is used to compute the RSE velocity error metric in three-dimensional space.

From the definition of the RSE metric, a tracking filter yielding consistently good estimates close to the ground truth values will enable the error between the estimated values and the corresponding ground truth values to be "small" and hence the RSE metric will also be correspondingly small. Conversely, a poorly performing tracking filter whose estimates are consistently at variance with the ground truth values produces large RSE values. Specific RSE tracking performance metrics can be evaluated for several Benchmark trajectories beginning with Tr(2,2). See G. A. Watson et al.: "Benchmark Problem with a Multisensor Framework for Radar Resource Allocation . . . " NSWCDD TR 99-32.

Figure 2:
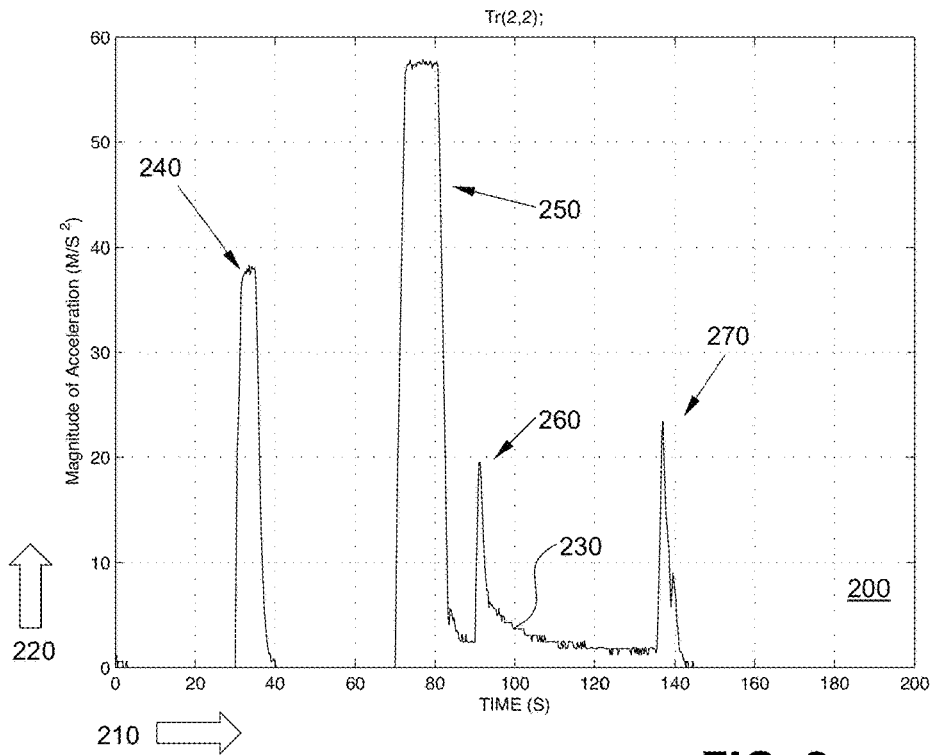
FIG. 2 is a graphical view of an acceleration profile for a first target trajectory.

Example trajectories include comparatively benign Tr(2, 2). FIG. 2 shows a graphical view 200 of Benchmark Target Trajectory Tr(2,2) involving four distinct maneuvers. The abscissa 210 denotes time in seconds (s) and the ordinate 220 denotes acceleration magnitude in meter-per-second-squared (m/s$^2$). A line 230 denotes the transient acceleration for the Tr(2,2) trajectory featuring the first, second, third and fourth maneuvers, respectively 240, 250, 260 and 270, of which the second 250 is the largest at 70-80 s, and the first 240 is the next largest at 30-35 s.

The acceleration profile of a target is very important because during target accelerations the filter track estimates lag the ground truth values, resulting in an increase in the RSE metrics. Conversely during non-accelerating time intervals the filter estimates improve and the RSE metrics get smaller. Thus throughout the length of a given scenario, there will be time segments where the RSE metrics increase rapidly due to a maneuver and others where they diminish rapidly to small values when a maneuver ceases. In view 200, this target executes maneuvers at time t=(30, 70, 90, 135) seconds.

Figure 3:
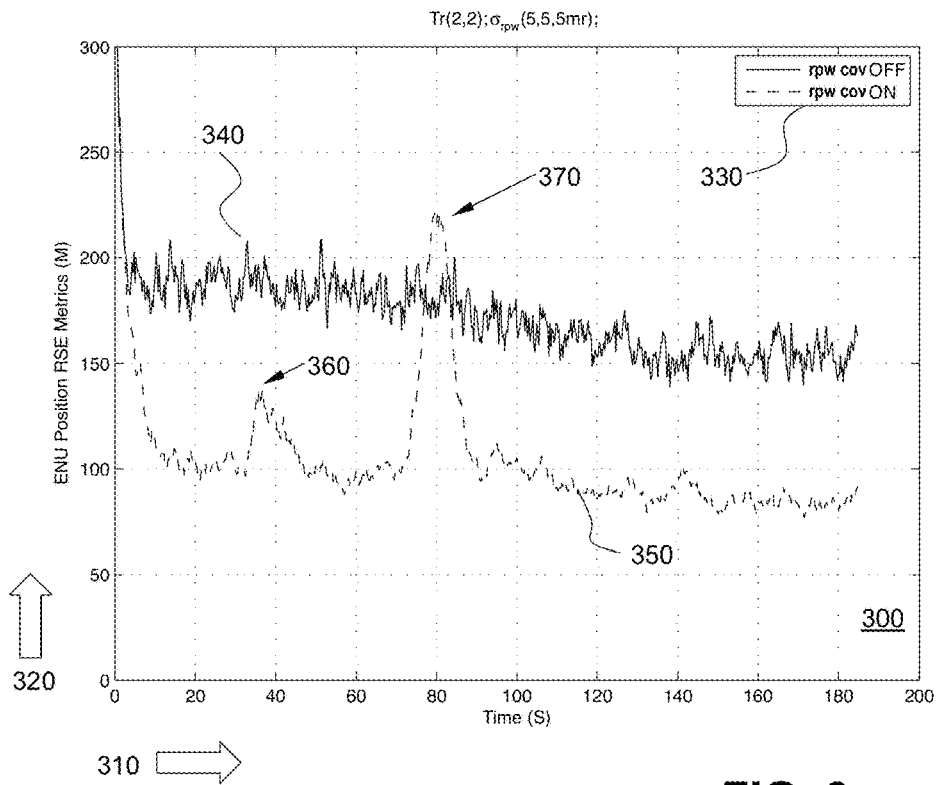
FIG. 3 is a graphical view of position metrics comparing conventional and exemplary filtering for the first trajectory under high noise.

FIGS. 3 through 6 show plots of transient tracking metrics for the Tr(2,2) trajectory under high noise conditions, quantified as $(\sigma_r, \sigma_p, \sigma_w)=(5,5,5)$ milliradians (mr). FIG. 3 shows a graphical view 300 of two RSE position metrics plotted for this trajectory as described in the ENU frame 130 under conditions of high noise. The abscissa 310 denotes time in seconds (s) and the ordinate 320 denotes RSE position metric in meters (m). A legend 330 identifies solid and dash lines relating the transient RSE position metric. The solid line 340 signifies the RSE position metric when the exemplary angle covariance term $M_C = M_A M_E M_A^T$ (rpw cov) is turned OFF in the tracking filter. When this angle covariance matrix is turned OFF, the total covariance of the transformed data only includes the conventional coordinate error terms provided by (an abbreviated form) $P_S = M_S = TM_U T^T$. When this matrix is turned ON, the total covariance of the transformed data is provided by eqn. (31) that includes the angle covariance term. The dash line 350 shows the same RSE metric when the exemplary covariance matrix is turned ON, exhibiting a lower level of error than the solid line 340. The RSE metric dash line 350 (exemplary matrix ON) shows two spikes 360 and 370 that respectively correspond to the first and second maneuvers 240 and 250, whereas the RSE metric solid line 340 (matrix OFF conventionally) fails to reveal these.

First, other than for a brief interval in the vicinity of t=80 s corresponding to the second spike 370, the RSE position metric dash line 350 is consistently lower than the RSE metric solid line 340. Further the RSE position metric dash line 350 clearly shows sudden jumps (increases) at times t=(30,70,90,135) s, especially at spikes 360 and 370, which correspond precisely to the target maneuver times in view 200. When each maneuver ceases, the dash line 350 rapidly decreases towards much lower values. These sudden RSE value jumps followed by rapid decreases when the maneuver ends come as no surprise for the dash line 350 because such behavior has been predicted based on the established trajectory. A particularly unexpected result is the lack of apparent sudden jumps in the solid line 340. Due to the high noise, the solid line 340 is largely oblivious to the maneuvers being executed by the target. What causes this behavior? The source of the problem lies in the standard deviation values of the (r, p, w) measurement errors. A standard deviation of 5 mr is used for each of these roll, pitch and yaw angles. This represents a "high-noise" value in so far as the solid line 340 is concerned. The estimates are so poor and the resulting estimate errors so large that the maneuvers are completely obscured by conventional filtering.

By contrast, when the exemplary covariance matrix $M_C = M_A M_E M_A^T$ is included, or turned ON (effectively activated), this enables the same tracking filter under identical "high noise" conditions to yield much superior tracking metrics as demonstrated by the dash line 350. Clearly what constitutes "high noise" for one case (conventional RSE) is relatively "low noise" for the other (exemplary covariance RSE). The only incidence of the dash line 350 amplitude exceeding that of the solid line 340 occurs on the second spike 370 at t=80 s. This situation lasts only for a brief interval and is to be expected for the following reason. With the exemplary covariance matrix turned ON, the total measurement noise covariance matrix $P_S$ has greater overall uncertainty than when it is turned OFF. This causes the Kalman gain matrix to have somewhat deflated values causing a momentary delay in the filter responding to the sudden maneuver onset at t=70 s. This situation does not occur for the other (smaller) maneuvers.

Figure 4:
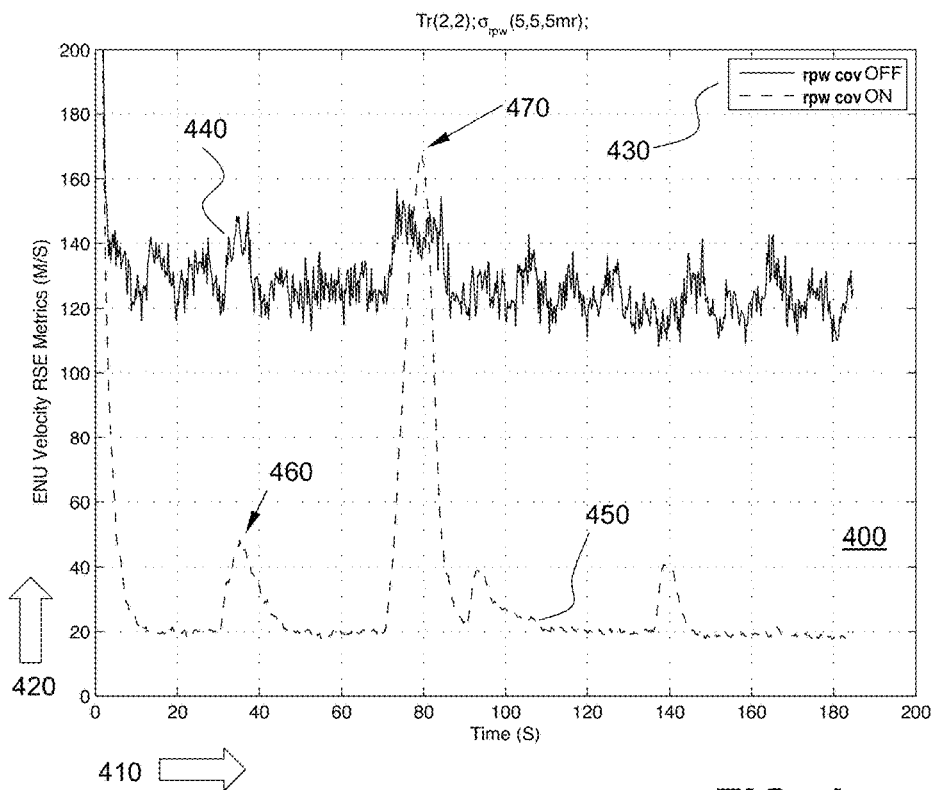
FIG. 4 is a graphical view of velocity metrics comparing conventional and exemplary filtering for the first trajectory under high noise.

FIG. 4 shows a graphical view 400 of two RSE velocity metrics plotted for the Tr(2,2) trajectory as described in the ENU frame 130 under conditions of high noise. The abscissa 410 denotes time (s) and the ordinate 420 denotes RSE velocity metric in meters-per-second (m/s). A legend 430 identifies solid and dash lines relating the transient RSE velocity metric. The solid line 440 signifies the RSE velocity metric when the exemplary angle covariance matrix $M_C=M_A M_E M_A^T$ is turned OFF in the tracking filter. The dash line 450 shows the same RSE metric when the exemplary covariance matrix is turned ON, exhibiting a lower level of noise than the solid line 440. The dash line 450 (exemplary matrix ON) shows two spikes 460 and 470 that respectively correspond to the first and second maneuvers 240 and 250, whereas the solid line 440 (matrix OFF conventionally) fails to reveal these as clearly.

The metric values in dash line 450 for non-maneuver time interval are typically 80% smaller than the metric values in solid line 440 for these same time intervals. The brief time interval in the vicinity of t=80 s where the dash line 450 exceeds values on the solid line 440 is due to the same effects as discussed for view 300. The onset of maneuvers is somewhat more observable in the velocity metrics for solid line 440 than in the position metrics for solid line 340.

Using the IMM as the vehicle for illustrating the benefits of the present invention affords us another and somewhat unique basis of comparison; this basis involves the IMM switching probabilities. These switching probabilities are of a somewhat esoteric concept that requires a fairly detailed discussion of the filter architecture. For the purposes of the present discussion, the IMM architecture computes two probabilities as indicated by Genovese. These probabilities are referred to CV1 (non-maneuvering probability) and CV2 (maneuvering probability) in the plots. When the target is not executing a maneuver the CV1 probability should be "high" (0.8) and CV2 "low" (0.2). These numbers should reverse when the target is executing a maneuver. While comparing these probabilities for different scenarios may not be a widely accepted performance metric, nevertheless they offer a unique and important insight into the benefit of the exemplary covariance matrix $M_C=M_A M_E M_A^T$ on tracking performance.

Figure 5:
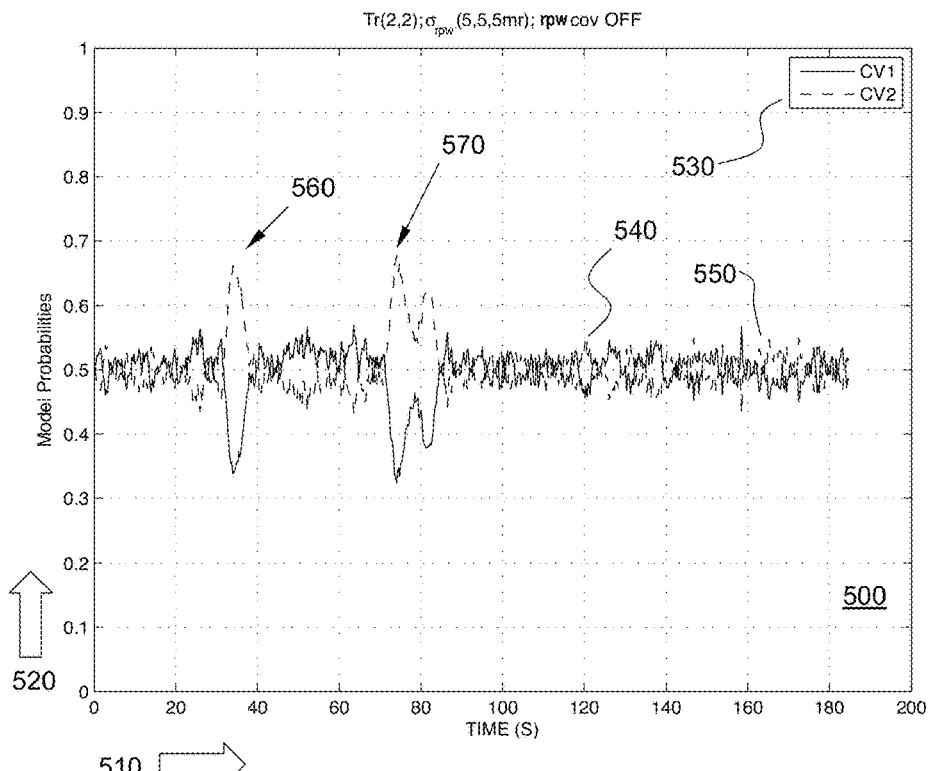
FIG. 5 is a graphical view of maneuver probabilities for conventional filtering for the first trajectory under high noise.

Returning to trajectory Tr(2,2), FIG. 5 shows a graphical view 500 of the two filter probabilities CV1 and CV2 for the case in which the exemplary covariance matrix is conventionally turned OFF under the high noise angle measurements. The abscissa 510 denotes time (s) and the ordinate 520 denotes model probabilities. A legend 530 identifies solid and dash lines relating CV1 and CV2, respectively. The solid line 540 depicts non-maneuvering probability CV1, while the dash line 550 displays maneuvering probability CV2. The conventional filter has considerable difficulty discriminating between the times when a maneuver is being executed and times when no maneuver occurs. Essentially the probabilities indicate that there is an equal probability of either event happening at all, except for a few isolated brief time intervals at peaks 560 and 570 that correspond to maneuvers 240 and 250.

Figure 6:
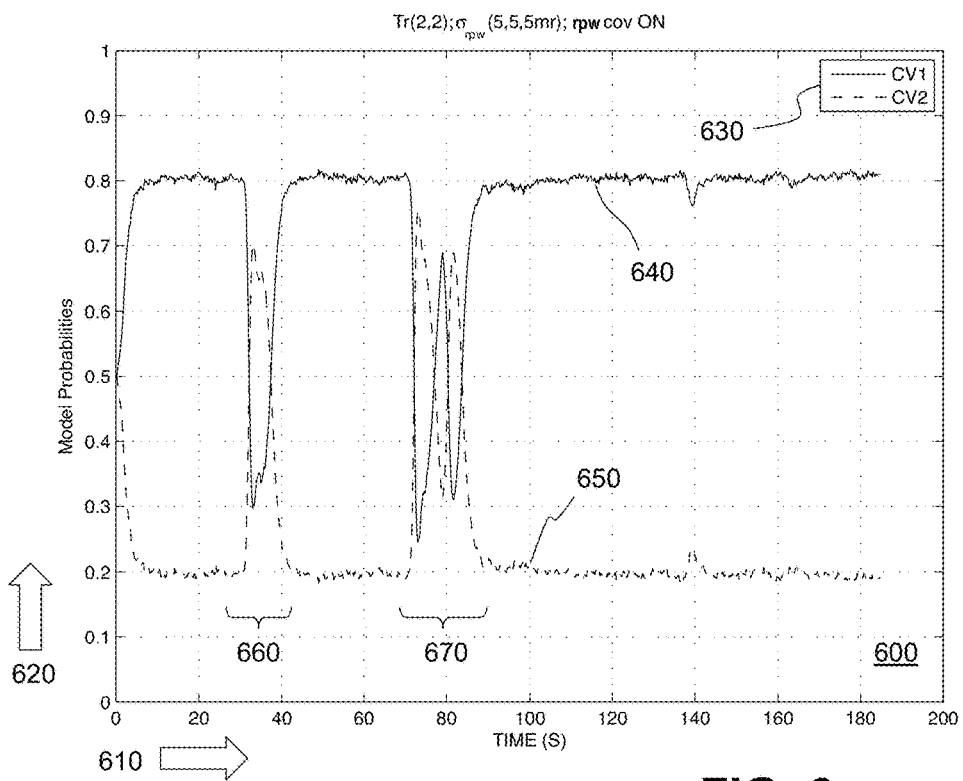
FIG. 6 is a graphical view of maneuver probabilities for exemplary filtering for the first trajectory under high noise.

FIG. 6 shows a graphical view 600 of these same probabilities under identical scenario conditions as view 500, but which instead have the exemplary covariance matrix turned ON. The abscissa 610 denotes time (s) and the ordinate 620 denotes model probabilities. A legend 630 identifies solid and dash lines relating CV1 and CV2, respectively. The solid line 640 depicts non-maneuvering probability CV1, while the dash line 650 displays maneuvering probability CV2. The exemplary filter probabilities converge rapidly to appropriate values both at the onset of a maneuver and also when a maneuver ceases, switching values at intervals 660 and 670 as corresponding to the maneuvers 240 and 250. The filter reveals no difficulty detecting the onset of a maneuver and the termination of that same maneuver.

Figure 7:
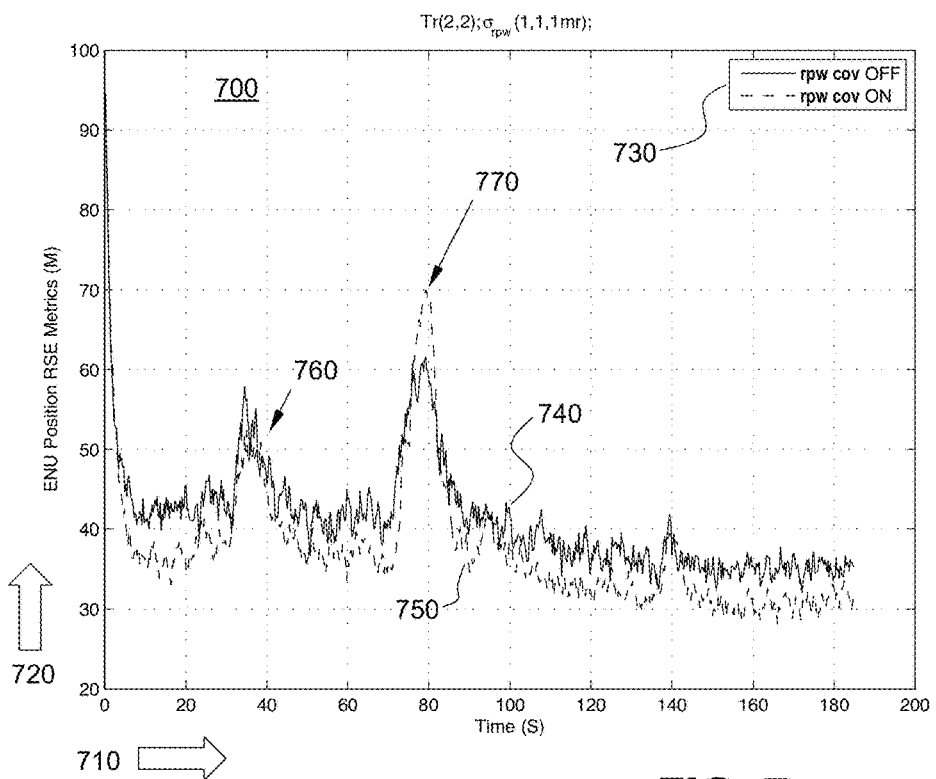
FIG. 7 is a graphical view of position metrics comparing conventional and exemplary filtering for the first trajectory under low noise.

FIGS. 7 through 10 show plots of transient tracking metrics for the Tr(2,2) trajectory under low noise conditions, quantified as $(\sigma_r, \sigma_p, \sigma_w)=(1,1,1)$ milliradians (mr). Performance of the tracking metrics for the same trajectory is similar to FIGS. 3 through 6 but now under much reduced ("low") noise conditions. FIG. 7 shows a graphical view 700 of two RSE position metrics plotted for this trajectory as described in the ENU frame 130 under conditions of low noise. The abscissa 710 denotes time (s) and the ordinate 720 denotes RSE position metric (m). A legend 730 identifies solid and dash lines relating the transient RSE position metric. The solid line 740 signifies the RSE position metric when the exemplary angle covariance matrix is turned OFF in the tracking filter. The dash line 750 shows the same RSE metric when the exemplary angle covariance matrix is turned ON, exhibiting a somewhat lower level of noise than the solid line 740. Both RSE position metric solid and dash lines 740 and 750 show two spikes 760 and 770 that respectively correspond to the first and second maneuvers 240 and 250, albeit with the dash line 750 revealing the difference more strongly than the solid line 740.

Figure 8:
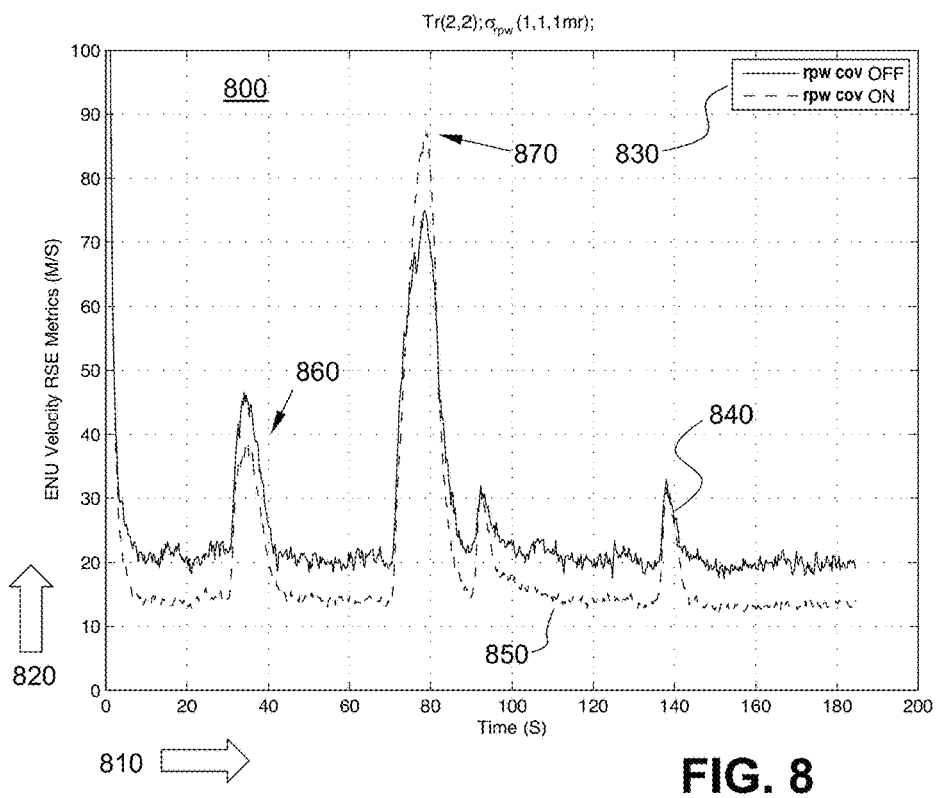
FIG. 8 is a graphical view of velocity metrics comparing conventional and exemplary filtering for the first trajectory under low noise.

FIG. 8 shows a graphical view 800 of two RSE velocity metrics plotted for the Tr(2,2) trajectory as described in the ENU frame 130 under conditions of low noise with standard deviation of 1 mr for each angle. The abscissa 810 denotes time (s) and the ordinate 820 denotes RSE velocity metric (m/s). A legend 830 identifies solid and dash lines relating the transient RSE velocity metric. The solid line 840 signifies the RSE velocity metric when the exemplary angle covariance matrix is turned OFF in the tracking filter. The dash line 850 shows the same RSE metric when the exemplary covariance matrix is turned ON, exhibiting a lower level of noise than the solid line 840. Both RSE velocity metric solid and dash lines 840 and 850 show two spikes 860 and 870 that respectively correspond to the first and second maneuvers 240 and 250.

As anticipated, the differences between the two RSE metrics plots in views 700 and 800 are much smaller than the differences in the corresponding metric plots in views 300 and 400 for the "high" noise case. The dash lines 750 and 850 have consistently lower values than the corresponding solid lines 740 and 840, except for the second spikes 770 and 870 that occur at t=80 s for the second maneuver 250. This condition is due to the reduced Kalman Gain matrix values mentioned previously.

Figure 9:
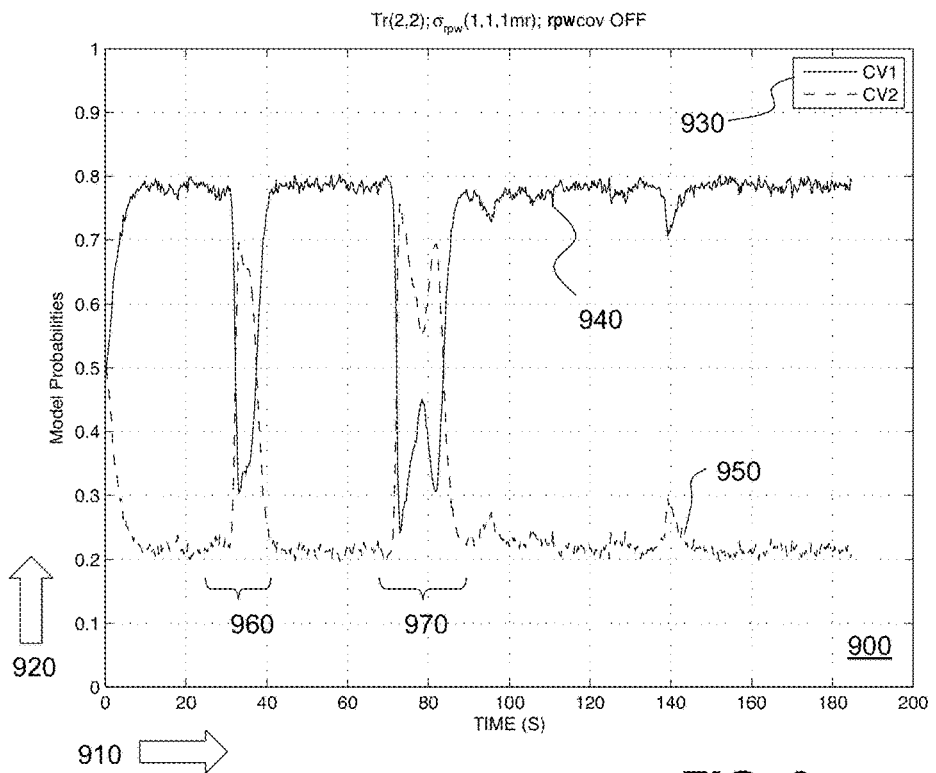
FIG. 9 is a graphical view of maneuver probabilities for conventional filtering for the first trajectory under low noise.
Figure 10:
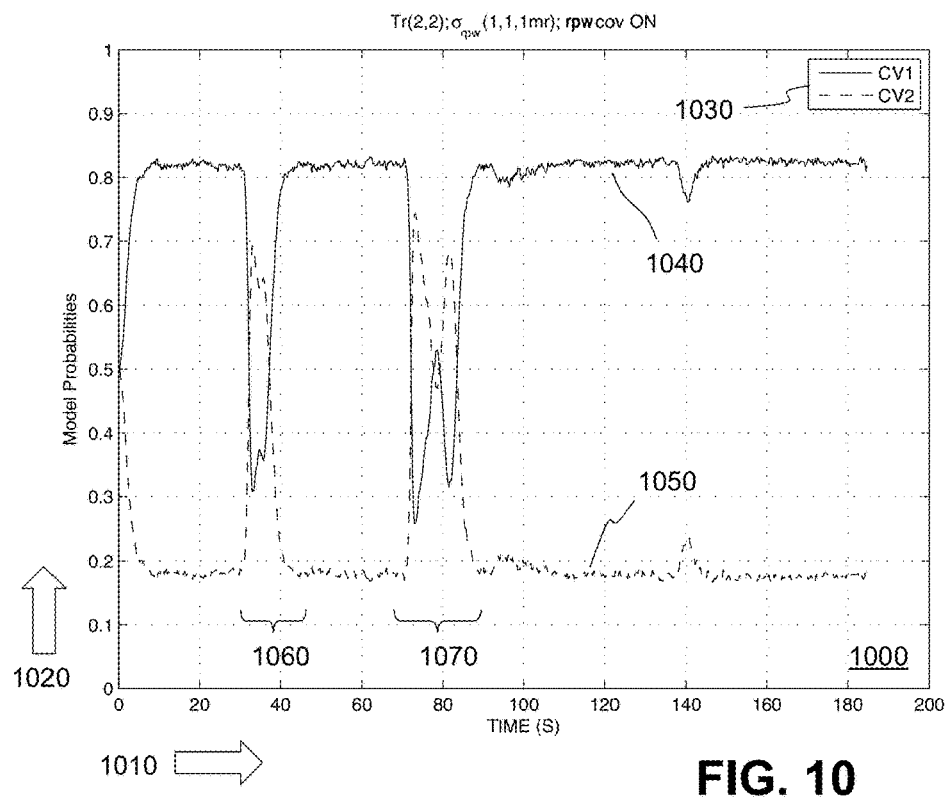
FIG. 10 is a graphical view of maneuver probabilities for exemplary filtering for the first trajectory under low noise.

Additionally, FIGS. 9 and 10 show the switching probabilities with the exemplary covariance (coy) turned OFF and ON, respectively. FIG. 9 shows a graphical view 900 of the two filter probabilities CV1 and CV2 for the conventional case in which the covariance matrix is turned OFF under the low noise angle measurements. The abscissa 910 denotes time (s) and the ordinate 920 denotes model probabilities. A legend 930 identifies solid and dash lines relating CV1 and CV2, respectively. The solid line 940 depicts non-maneuvering probability CV1, while the dash line 950 displays maneuvering probability CV2. Both lines 940 and 950 clearly exhibit switching intervals 960 and 970 that correspond to maneuvers 240 and 250.

FIG. 10 shows a graphical view 1000 of these same probabilities under identical scenario conditions as view 900, but which instead have the exemplary covariance matrix turned ON. The abscissa 1010 denotes time (s) and the ordinate 1020 denotes model probabilities. A legend 1030 identifies solid and dash lines relating CV1 and CV2, respectively. The solid line 1040 depicts non-maneuvering probability CV1, while the dash line 1050 displays maneuvering probability CV2. Both lines 1040 and 1050 clearly exhibit switching intervals 1060 and 1070 that correspond to maneuvers 240 and 250.

At first glance, these two views 900 and 1000 in FIGS. 9 and 10 appear virtually identical. Under low noise conditions, this is not unexpected. On closer viewing there is a noticeably slight but nevertheless superior discrimination between the probabilities in view 1000 than in view 900. For example in view 900, the probabilities are almost always less the 0.8 and greater than 0.2, while in view 1000, the probability values exceed 0.8 and drop below 0.2. Thus in the "low" noise case, there is better discrimination between the switching probabilities in the covariance matrix ON condition.

Figure 11:
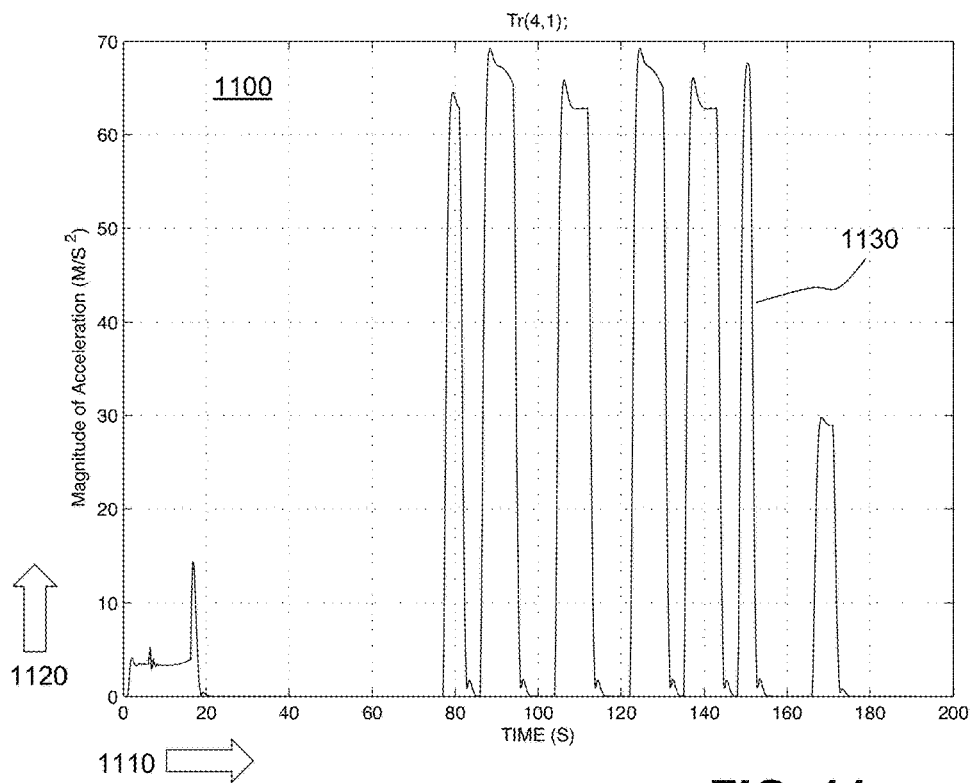
FIG. 11 is a graphical view of an acceleration profile for a second target trajectory.

Much More Challenging Condition—Highly Maneuvering Target: The next trajectory is Benchmark Tr(4,1) with a series of six high-g maneuvers, typically 6-to-7 g's in rapid succession. FIG. 11 shows a graphical view 1100 of Benchmark Target Trajectory Tr(4,1) involving these seven distinct maneuvers. The abscissa 1110 denotes time (s) and the ordinate 1120 denotes acceleration magnitude (m/s$^2$). A line 1130 denotes the transient acceleration for the Tr(4,1) trajectory featuring these maneuvers at t=(76, 86, 104, 122, 135, 150, 170) s.

Figure 12:
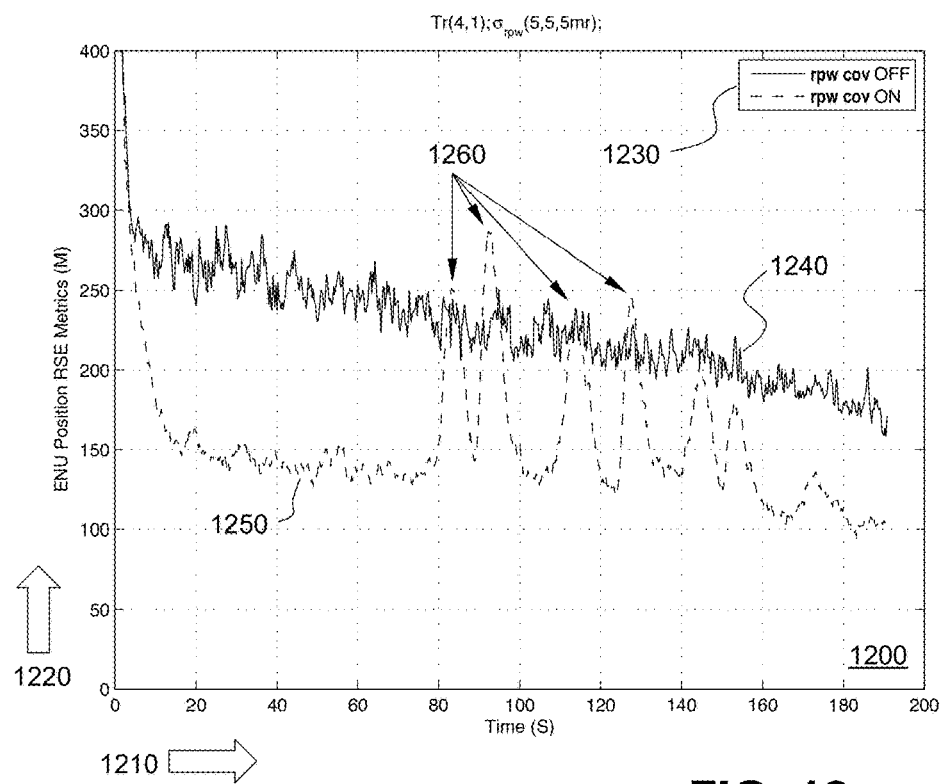
FIG. 12 is a graphical view of position metrics comparing conventional and exemplary filtering for the second trajectory under high noise.

FIGS. 12 through 15 show plots of transient tracking metrics for the Tr(4,1) trajectory under high noise conditions, quantified as $(\sigma_r, \sigma_p, \sigma_w)$=(5,5,5) mr. FIG. 12 shows a graphical view 1200 of two RSE position metrics plotted for this trajectory as described in the ENU frame 130 under conditions of high noise. The abscissa 1210 denotes time (s) and the ordinate 1220 denotes RSE position metric (m). A legend 1230 identifies solid and dash lines relating the transient RSE position metric with the exemplary angle covariance matrix $M_C$. The solid line 1240 signifies the RSE position metric when the exemplary covariance matrix is turned OFF in the tracking filter. The dash line 1250 shows the same RSE metric when the exemplary covariance matrix is turned ON, exhibiting a lower level of noise than the solid line 1240. The RSE metric dash line 1250 (exemplary matrix ON) reveals several spikes 1260 that respectively correspond to all seven maneuvers shown in line 1130, whereas the RSE metric solid line 1240 (conventionally, with matrix OFF) fails to reveal these.

First, other than for brief intervals at about t=(82, 92, 127) s corresponding to the first, second and fourth spikes, the RSE position metric dash line 1250 is consistently lower than the RSE metric solid line 1240. Further the RSE position metric dash line 1250 clearly shows sudden jumps (increases) that correspond precisely to the target maneuver times in view 1100. When each maneuver ceases, the dash line 1250 rapidly decreases towards much lower values. These sudden RSE value jumps 1260 followed by rapid decreases when the maneuver ends are expected for the dash line 1250 because such behavior has been predicted based on the target's established trajectory, but fail to be apparent in the solid line 1240, due to the high noise.

The cause of this behavior lies in the standard deviation values of the (r, p, w) measurement errors. A standard deviation of 5 mr is used for each of these roll, pitch and yaw angles. This represents a "high-noise" value in so far as the solid line 1240 is concerned. The estimates are so poor and the resulting estimate errors so large that the maneuvers are completely obscured by conventional filtering. Using the inventive technique, the incorporation of the exemplary covariance matrix enables the same tracking filter under identical "high noise" conditions to yield much superior tracking metrics as demonstrated by the dash line 1250. Clearly what constitutes "high noise" for one case (conventional RSE) is relatively "low noise" for the other (exemplary covariance RSE).

Figure 13:
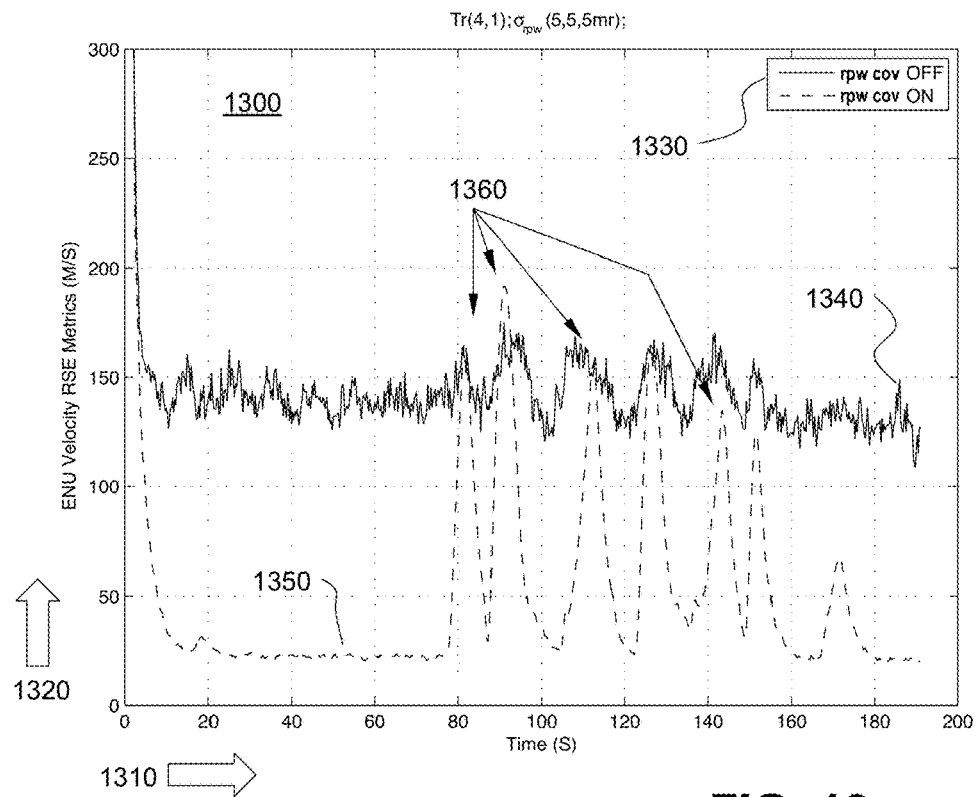
FIG. 13 is a graphical view of velocity metrics comparing conventional and exemplary filtering for the second trajectory under high noise.

FIG. 13 shows a graphical view 1300 of two RSE velocity metrics plotted for the Tr(4,1) trajectory as described in the ENU frame 130 under conditions of high noise. The abscissa 1310 denotes time (s) and the ordinate 1320 denotes RSE velocity metric (meters-per-second, m/s). A legend 1330 identifies solid and dash lines relating the transient RSE velocity metric. The solid line 1340 signifies the RSE velocity metric when the exemplary angle covariance matrix is turned OFF in the tracking filter. The dash line 1350 shows the same RSE metric when the exemplary covariance matrix is turned ON, exhibiting a lower level of noise than the solid line 1340. The dash line 1350 (exemplary) shows seven spikes 1360 that correspond to the maneuvers indicated by line 1130, whereas the solid line 1340 (conventional) fails to reveal these clearly.

In view 1300, the same effects for the RSE velocity metrics can be witnessed as the RSE position metrics in view 1200. The metric values in dash line 1350 for non-maneuver time interval are typically 85% smaller than the metric values in solid line 1340 for these same time intervals. The brief time interval in the vicinity of t=92 s where the dash line 1350 exceeds values on the solid line 1340 is due to the same effects of increased uncertainty on the Kalman gain matrix, as discussed previously. The onset of maneuvers is somewhat more observable in the velocity metrics for solid line 1340 than in the position metrics for solid line 1240.

Figure 14:
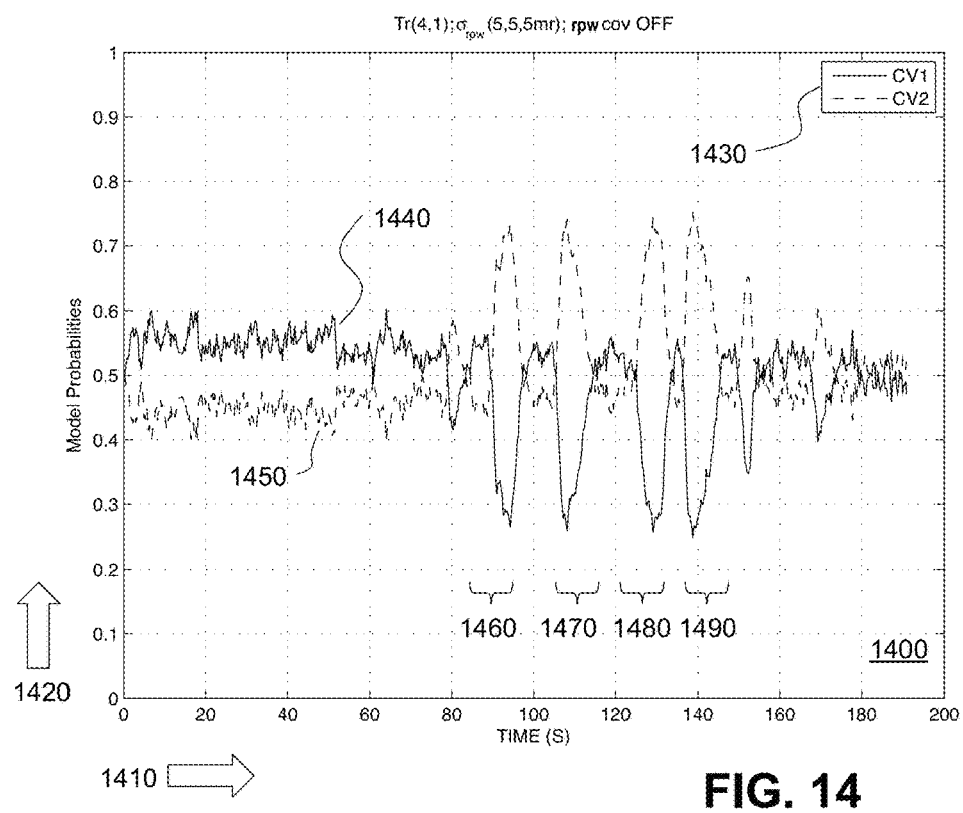
FIG. 14 is a graphical view of maneuver probabilities for conventional filtering for the second trajectory under high noise.

FIG. 14 shows a graphical view 1400 for Tr(4,1) of the two filter probabilities CV1 (non-maneuvering) and CV2 (maneuvering) for the case in which the exemplary covariance matrix is conventionally turned OFF under the high noise angle measurements. The abscissa 1410 denotes time (s) and the ordinate 1420 denotes model probabilities. A legend 1430 identifies solid and dash lines relating CV1 and CV2, respectively. The solid line 1440 depicts non-maneuvering probability CV1, while the dash line 1450 displays maneuvering probability CV2. While the conventional filter can discriminate between intervals when a maneuver is being executed and times when no maneuver occurs their separation has a maximum of only 0.1 between the probabilities without maneuver and about 0.5 between the probabilities while a maneuver occurs, as indicated by line 1130.

Figure 15:
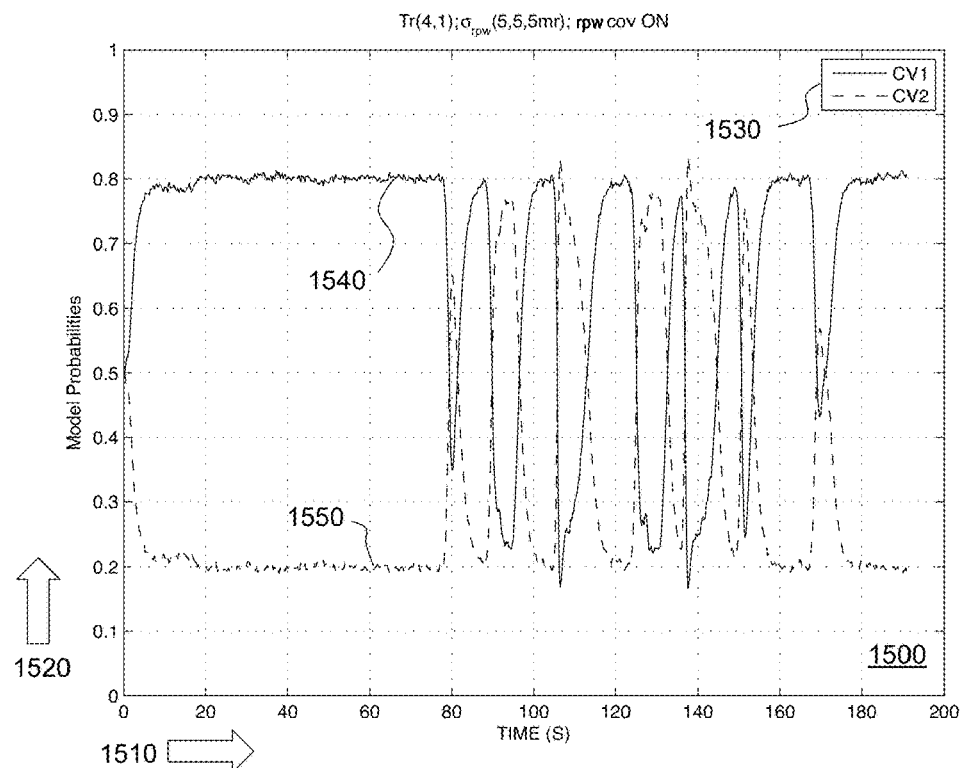
FIG. 15 is a graphical view of maneuver probabilities for exemplary filtering for the second trajectory under high noise.

FIG. 15 shows a graphical view 1500 of these same probabilities under identical scenario conditions as view 1400, but which instead have the exemplary covariance matrix turned ON. The abscissa 1510 denotes time (s) and the ordinate 1520 denotes model probabilities. A legend 1530 identifies solid and dash lines relating CV1 and CV2, respectively. The solid line 1540 depicts non-maneuvering probability CV1, while the dash line 1550 displays maneuvering probability CV2. The exemplary filter probabilities converge rapidly to appropriate values at both a maneuver's onset and termination, switching values as corresponding to the temporal maneuvers indicated by line 1130. Separation between the probabilities remains at 0.6 under non-maneuvering conditions as well as after switching.

Robustness Property of Exemplary Embodiments: View 1400 evidences by the very close probabilities, that the IMM architecture has considerable difficulty determining maneuver occurrences of a target. With the addition of the exemplary covariance matrix observable from view 1500 the architecture can not only clearly discriminate between both of these conditions but also responds rapidly to each change. To emphasize the robustness that the exemplary embodiments afford, the same scenario as in view 1100, namely Tr(4,1) can be taken with double the standard deviation of the angle measurement errors as 10 mr for each of the roll, pitch and yaw maneuvers. This in effect doubles the (r, p, w) measurement errors.

Figure 16:
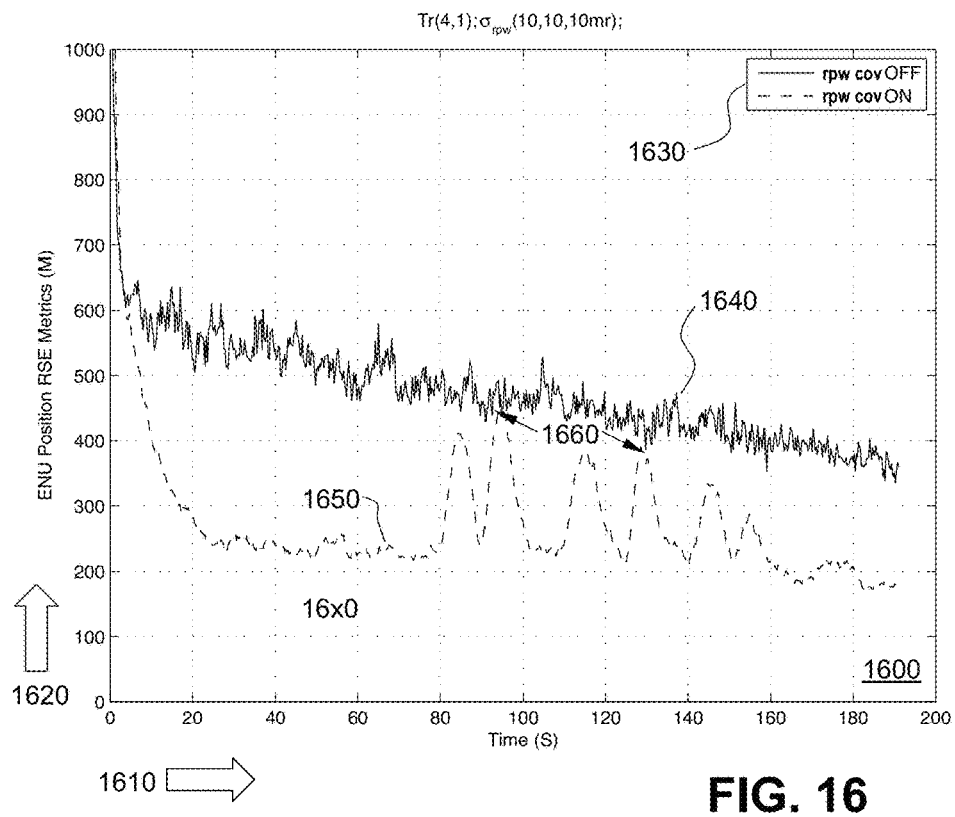
FIG. 16 is a graphical view of position metrics comparing conventional and exemplary filtering for the second trajectory under very high noise.

FIGS. 16 through 19 show plots of transient tracking metrics for the Tr(4,1) trajectory under very high noise conditions, quantified as $(\sigma_r, \sigma_p, \sigma_w) = (10,10,10)$ mr. FIG. 16 shows a graphical view 1600 of two RSE position metrics plotted for this trajectory as described in the ENU frame 130 under conditions of very high noise. The abscissa 1610 denotes time (s) and the ordinate 1620 denotes RSE position metric (m). A legend 1630 identifies solid and dash lines relating the transient RSE position metric. The solid line 1640 signifies the RSE position metric when the exemplary covariance matrix is turned OFF in the tracking filter. The dash line 1650 shows the same RSE metric when the exemplary covariance matrix is turned ON, exhibiting a lower level of noise than the solid line 1640. The RSE metric dash line 1650 (exemplary matrix ON) reveals several spikes 1660 that respectively correspond to all seven maneuvers shown in line 1130, whereas the RSE metric solid line 1640 (matrix OFF conventionally) fails to reveal these.

Figure 17:
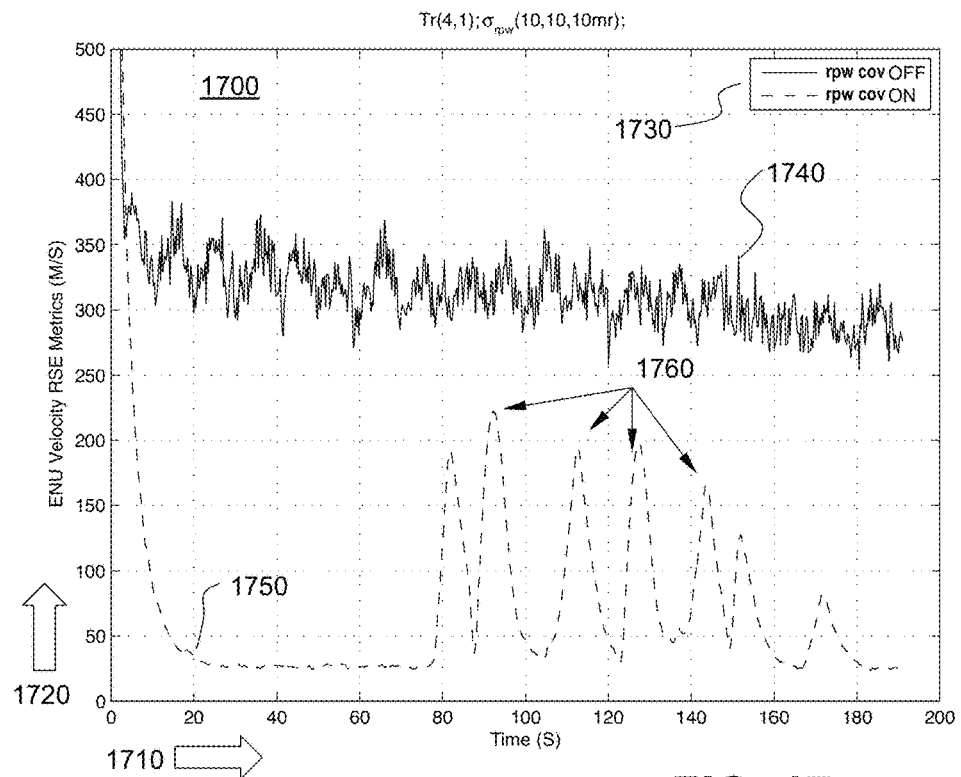
FIG. 17 is a graphical view of velocity metrics comparing conventional and exemplary filtering for the second trajectory under very high noise.

FIG. 17 shows a graphical view 1700 of two RSE velocity metrics plotted for the Tr(4,1) trajectory as described in the ENU frame 130 under conditions of very high noise. The abscissa 1710 denotes time (s) and the ordinate 1720 denotes RSE velocity metric (m/s). A legend 1730 identifies solid and dash lines relating the transient RSE velocity metric. The solid line 1740 signifies the RSE velocity metric when the exemplary angle covariance matrix is turned OFF in the tracking filter. The dash line 1750 shows the same RSE metric when the exemplary covariance matrix is turned ON, exhibiting a lower level of noise than the solid line 1740. The dash line 1750 (exemplary) shows seven spikes 1760 that correspond to the maneuvers indicated by line 1130, whereas the solid line 1740 (conventional) fails to suggest such disturbances within the noisy pattern.

Figure 18:
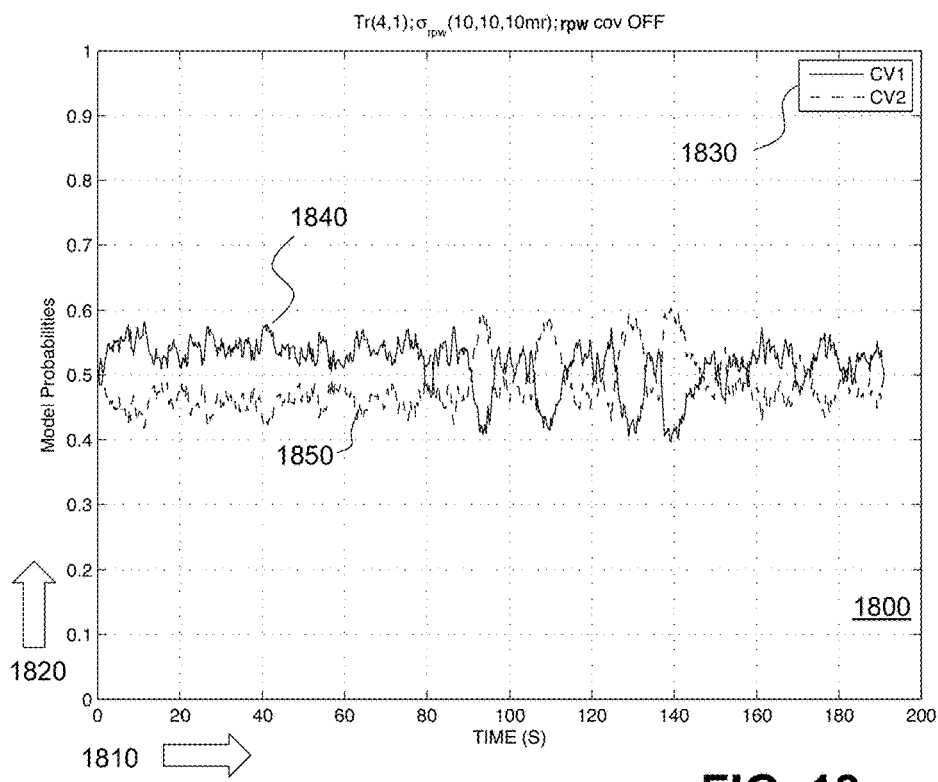
FIG. 18 is a graphical view of maneuver probabilities for conventional filtering for the second trajectory under very high noise.

FIG. 18 shows a graphical view 1800 for Tr(4,1) of the two filter probabilities CV1 (non-maneuvering) and CV2 (maneuvering) for the case in which the exemplary covariance matrix is conventionally turned OFF under the high noise angle measurements. The abscissa 1810 denotes time (s) and the ordinate 1820 denotes model probabilities. A legend 1830 identifies solid and dash lines relating CV1 and CV2, respectively. The solid line 1840 depicts non-maneuvering probability CV1, while the dash line 1850 displays maneuvering probability CV2. While the conventional filter can marginally discriminate between intervals when a maneuver is being executed and times when no maneuver occurs their separation has a maximum of less than 0.2 between the probabilities while a maneuver occurs, as indicated by line 1130.

Figure 19:
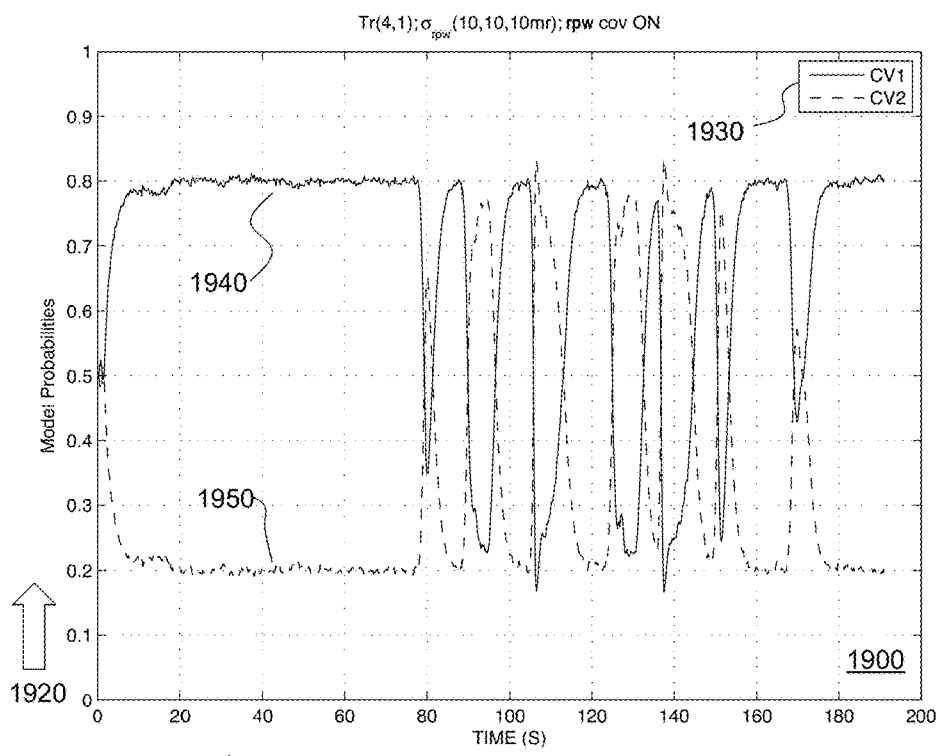
FIG. 19 is a graphical view of maneuver probabilities for exemplary filtering for the second trajectory under very high noise.

FIG. 19 shows a graphical view 1900 of these same probabilities under identical scenario conditions as view 1800, but which instead have the exemplary covariance matrix turned ON. The abscissa 1910 denotes time (s) and the ordinate 1920 denotes model probabilities. A legend 1930 identifies solid and dash lines relating CV1 and CV2, respectively. The solid line 1940 depicts non-maneuvering probability CV1, while the dash line 1950 displays maneuvering probability CV2. The exemplary filter probabilities converge rapidly to appropriate values both at a maneuver's onset of a maneuver's termination, and switching values as corresponding to the temporal maneuvers indicated by line 1130. Separation between the probabilities remains at 0.6 under non-maneuvering conditions as well as after switching, similar to results shown in view 1500 for half the high angle noise.

There are many other Benchmark trajectories against which exemplary embodiments have been tested; the results from these are entirely consistent with those seen above and hence are not included here. There are many variations on exemplary embodiments disclosed here that would be obvious to one skilled in the art. The transformation matrix T in eqn. (8) is arrived at by specific order of rotations known as the XYZ-convention. In this convention, the unstable-to-stable transformation order of rotations is as follows:

1. Rotate about the unstabilized $x_B$ axis through the roll angle r.
2. Next, rotate about the unstabilized $Y_B$ axis through the pitch angle p.
3. Finally rotate about the unstabilized $Z_B$ axis through the yaw angle w.

Order of rotations and permutations thereof: Clearly by ignoring conventions, one may use any of 3!=6 permutations of order to arrive at six different transformation matrices T. An artisan of ordinary skill could apply the same techniques disclosed herein to derive a corresponding equivalent angle covariance matrix eqn. (32) for each of these different possible permutations. The exemplary description involves transformation of position data, applying to all types of data such as velocity, acceleration and Doppler data. The techniques described also apply to the reverse transformation, namely from the stabilized to the unstabilized frames of reference. The exemplary covariance alternatively offers enhanced probability of correct contact-to-track decisions due to the superior modeling of the contact data error covariance matrix and the associated ellipsoid of uncertainty, quantities that critically influence this decision process.

Figure 20:
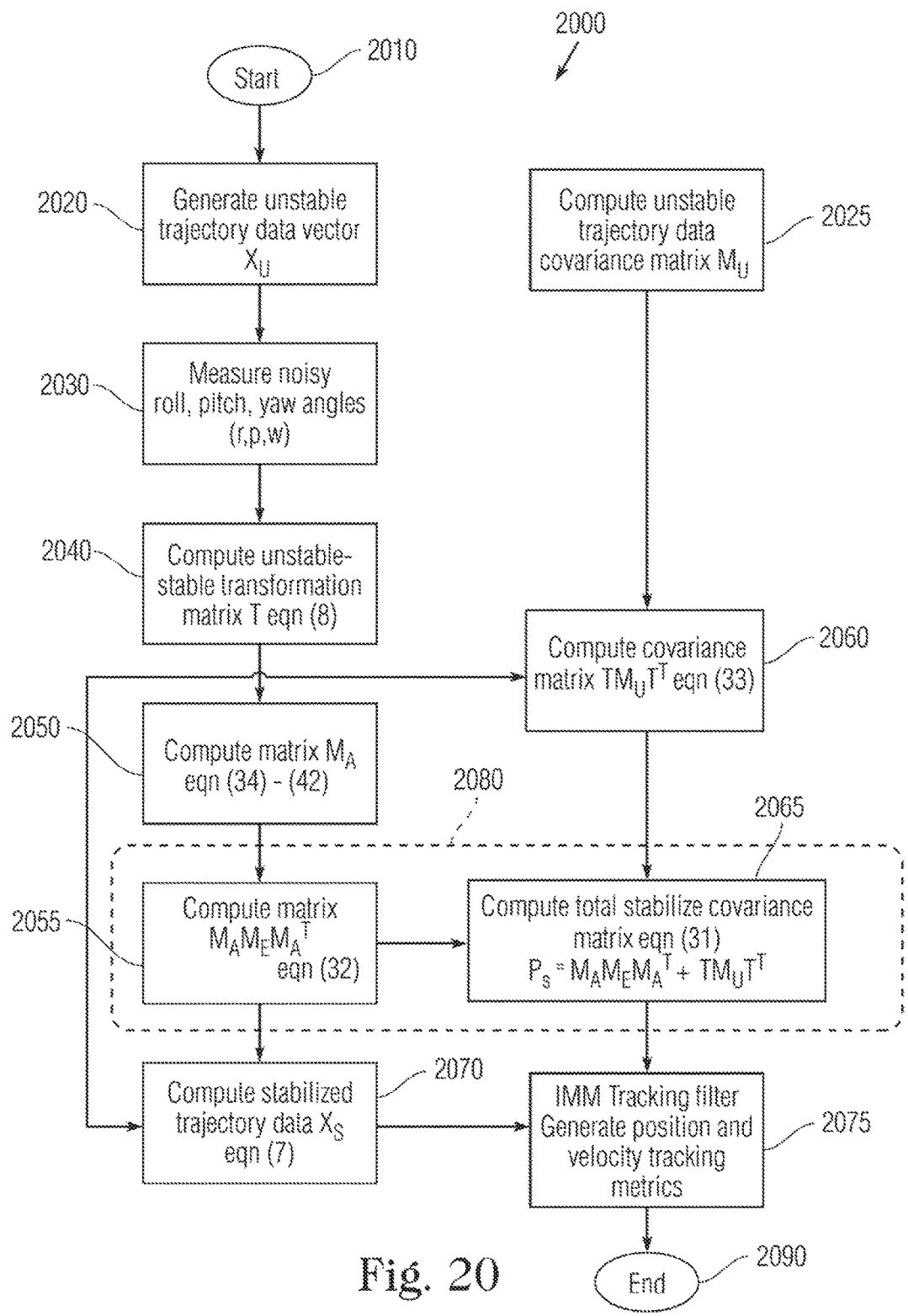
FIG. 20 is a flowchart view of program steps to perform coordinate transformation, generate an exemplary covariance matrix and performance metrics to provide error reduction.

FIG. 20 shows a flowchart view 2000 for simulating the coordinate transformation and thereby reduce the angle measurement error. The process initiates 2010 by establishing an unstabilized data vector $x_U$ from eqn. (5) (obtained via measured data) as operation 2020 and its associated covariance matrix $M_U$ from eqn. (6) as operation 2025 for signal filtering of motion-induced error. The process measures roll, pitch and yaw in the Body reference frame 120 as operation 2030, and then computes the unstable-to-stable transformation matrix T from eqn. (8) in operation 2040. Transformation branching includes computing angle matrix $M_A$ from eqn. (25) from eqns. (34) through (42), together with angle standard deviation matrix $M_E$ from eqn. (30) in operation 2050, followed by computing the angular covariance matrix $M_C = M_A M_E M_A^T$ from eqn. (32) in operation 2055, and computing the stabilized covariance matrix $M_S = T M_U T^T$ from eqn. (33) in operation 2060.

The operations 2055 and 2060 are followed by computing from eqn. (31) the total covariance matrix of the total stabilized data vector:

$$P_S = M_C + M_S = M_A M_E M_A^T + T M_U T^T, \qquad (54)$$

from the separate angle and translation covariance contributions in operation 2065. Finally, the stabilized data vector $x_S$ in eqns. (7) and (12) is computed in operation 2070. The stabilized data vector and corresponding stabilized covariance matrix form the input to the IMM architecture for generation of performance metrics in operation 2075 associated with correcting gain results from eqns. (45) and (50) for the Kalman gain matrix, which can be combined as:

$$K(k+1)=P(k+1|k)H^T[HP(k+1|k)H^T+P_S]^{-1}, \quad (55)$$

to provide angle-error corrected gain at the current time k+1, associated with the measurement and prediction update steps. The covariance operations 2055 and 2065 constitute an exemplary operational set 2080. The process concludes in termination 2090.

The exemplary process can be operated in automated fashion by logical and arithmetic operations using a general computational device programmed by a software-based method, or alternatively by a specially designed device with circuitry established for this purpose, or manually by pen and paper. The process is sufficiently novel as to preclude limitation based on the selection of the mechanism by which the operational steps are executed.

Figure 21:
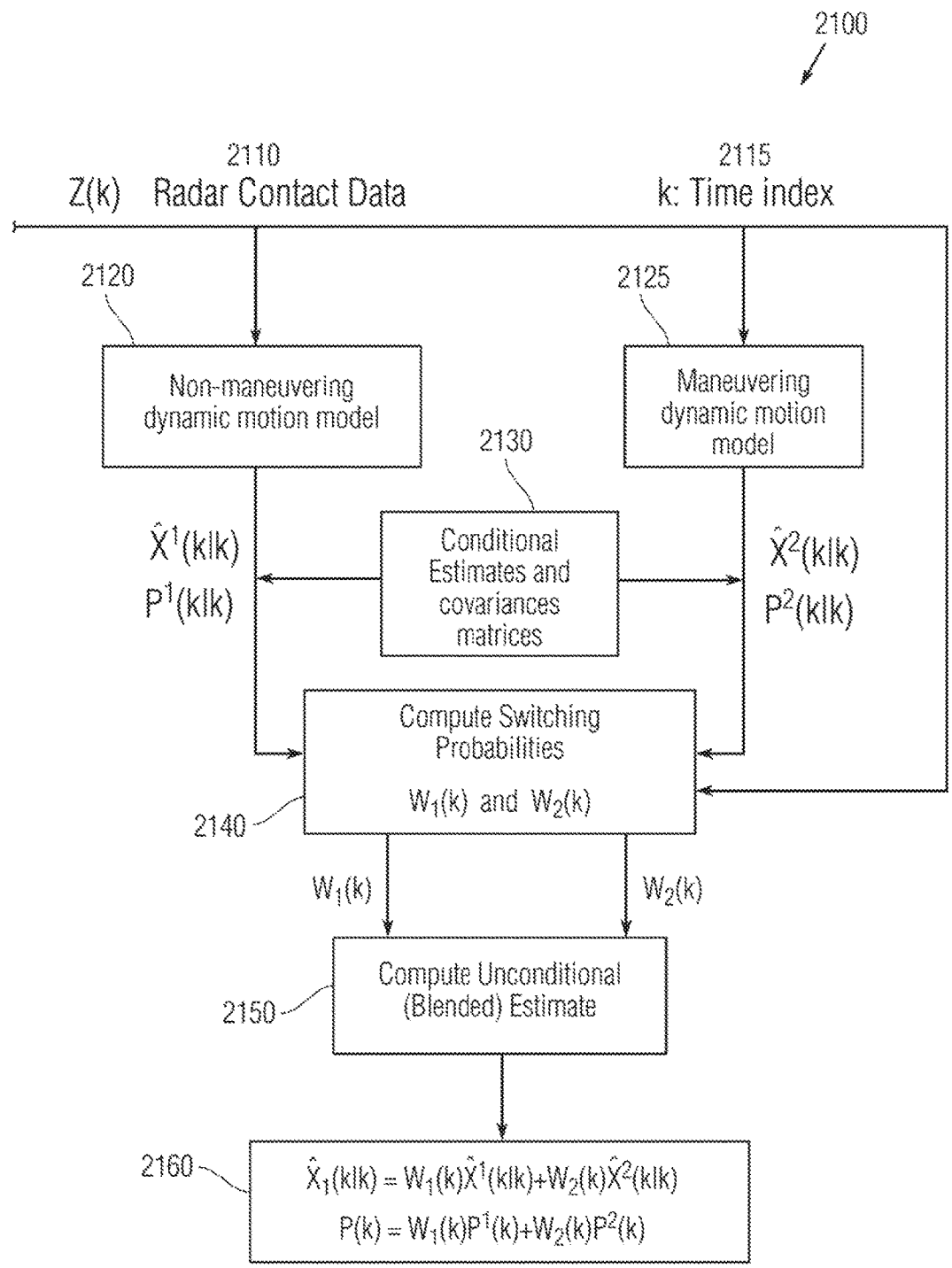
FIG. 21 is a flowchart view of an architecture of a generic multiple model tracking filter.

As a further explanation regarding IMM, the following material illustrates the basic principles of a generic multiple model tracking filter architecture, why multiple models are needed, and how the outputs of the multiple models are combined to produce an estimate of the target's position and velocity and its associated covariance matrix. This is important to understanding the exemplary embodiments. FIG. 21 shows a flow diagram view 2100 of a generic multiple model filter architecture. This process architecture reveals two different motion models into which is passed the same raw measurement data $Z(k)_{2110}$ for time k 2115.

Both data 2110 and time 2115 provide input to a non-maneuvering dynamic motion model 2120 and a maneuvering dynamic motion model 2125. These produce conditional estimates and covariance matrices 2130, which are received by a generic operator 2140 to compute switching probabilities. These switching probabilities that correspond to the filters are computed for each data point and are received by a processor 2150 that computes an unconditional (blended) estimate for whether the target detected by the radar data 2110 is either maneuvering or non-maneuvering. This produces unconditional (blended) values 2160 for the estimate and the covariance matrix. The first model 2120 non-maneuvering dynamic motion model assumes the target never maneuvers (i.e., accelerates). The second model 2125 maneuvering dynamic motion model assumes the target is always maneuvering. A separate Kalman filter is built around each of these models.

For any given trajectory, there are instances when a target is not maneuvering, and other times when the target is maneuvering. In the former case when the target is not maneuvering, the non-maneuvering model produces superior estimates of target position and velocity compared to the other model's estimates. The reverse holds when the target executes a maneuver the maneuvering model filter produces superior estimates. In the performance plots of model probabilities for FIGS. 5, 6, 9, 10, 14, 15, 18 and 19, the non-maneuvering model is designated as filter CV1 and the maneuvering model represents filter CV2.

The output estimate vector and covariance matrix from each of these filters is conditioned on the underlying model used to generate these estimates. For example the outputs from filter CV1, represented in FIG. 21 as conditional estimate $\hat{X}^1(k|k)$ and conditional covariance $P^1(k|k)$, signify that the estimates at time k are conditioned on the target not maneuvering. Similarly, outputs from filter CV2, as conditional estimate $\hat{X}^2(k|k)$ and conditional covariance $P^2(k|)$, signify that the estimates at time k are conditioned on the target maneuvering.

However, at any given instant of time k, the target may or may not be maneuvering. Without that knowledge of which, the individual conditional estimates produced by each filter are of relatively little value. Referring to FIG. 21, these conditional estimates 2130 are input to a generic operation 2140 labeled "Compute Switching Probabilities", which produces two switching probabilities $W_1(k)$ and $W_2(k)$, where $W_1(k)=\Pr\{\text{nonmaneuver at time k}\}$ and $W_2(k)=\Pr\{\text{maneuver at time k}\}$. Note that these two probabilities must always sum to unity, and that the switching probabilities $W_1(k)$ and $W_2(k)$ correspond to the output filters CV1 and CV2.

In accordance with probability theory, the output unconditional estimate is then computed by weighting each estimate vector (and its covariance matrix) by its associated switching probability as follows:

$$\hat{X}(k|k)=W_1(k)\hat{X}^1(k|k)+W_2(k)\hat{X}^2(k|k), \quad (56)$$

for the unconditional (blended) estimate, and $$P(k)=W_1(k)P^1(k)+W_2(k)P^2(k), \quad (57)$$

for the unconditional (blended) covariance matrix. Both estimate $\hat{X}(k|k)$ and covariance $P(k)$ constitute combinations of their probability weighted non-maneuvering and maneuvering constituents. These output unconditional estimates (sometimes referred to in the professional literature as blended estimates) are then used as inputs to a variety of subsequent processes such as track fusion, track-to-track correlation, etc.

As mentioned, the probabilities $W_1(k)$ and $W_2(k)$ are respectively labeled as CV1 and CV2 in the performance plots of model probabilities. In a multiple model tracking filter good separation is desirable between the switching probabilities. When the target is not executing a maneuver the $W_1(k)$ probability should be "high" (0.8 or higher) and the $W_2(k)$ probability "low" (0.2 or less). In this manner, the unconditional estimate in eqn. (56) is heavily weighted in favor of the non-maneuvering filter output CV1. When a non-maneuvering target suddenly begins to execute a maneuver, these switching probabilities should (and in the exemplary embodiments do) reverse values. The faster the detection of the incipient maneuver, the faster the weights will reverse their respective values making the unconditional estimate now heavily weighted in favor of the maneuvering filter output CV2.

When the maneuver ceases and the target is once again in a non-maneuvering mode, the switching probabilities should return rapidly to their previous values. The speed with which the probabilities reshuffle is critical to maintaining good tracking performance throughout the trajectory. Rapid detection and reshuffling of the switching probabilities is an important characteristic feature of the Interacting Multiple Model tracking filter architecture.

Figure 22:
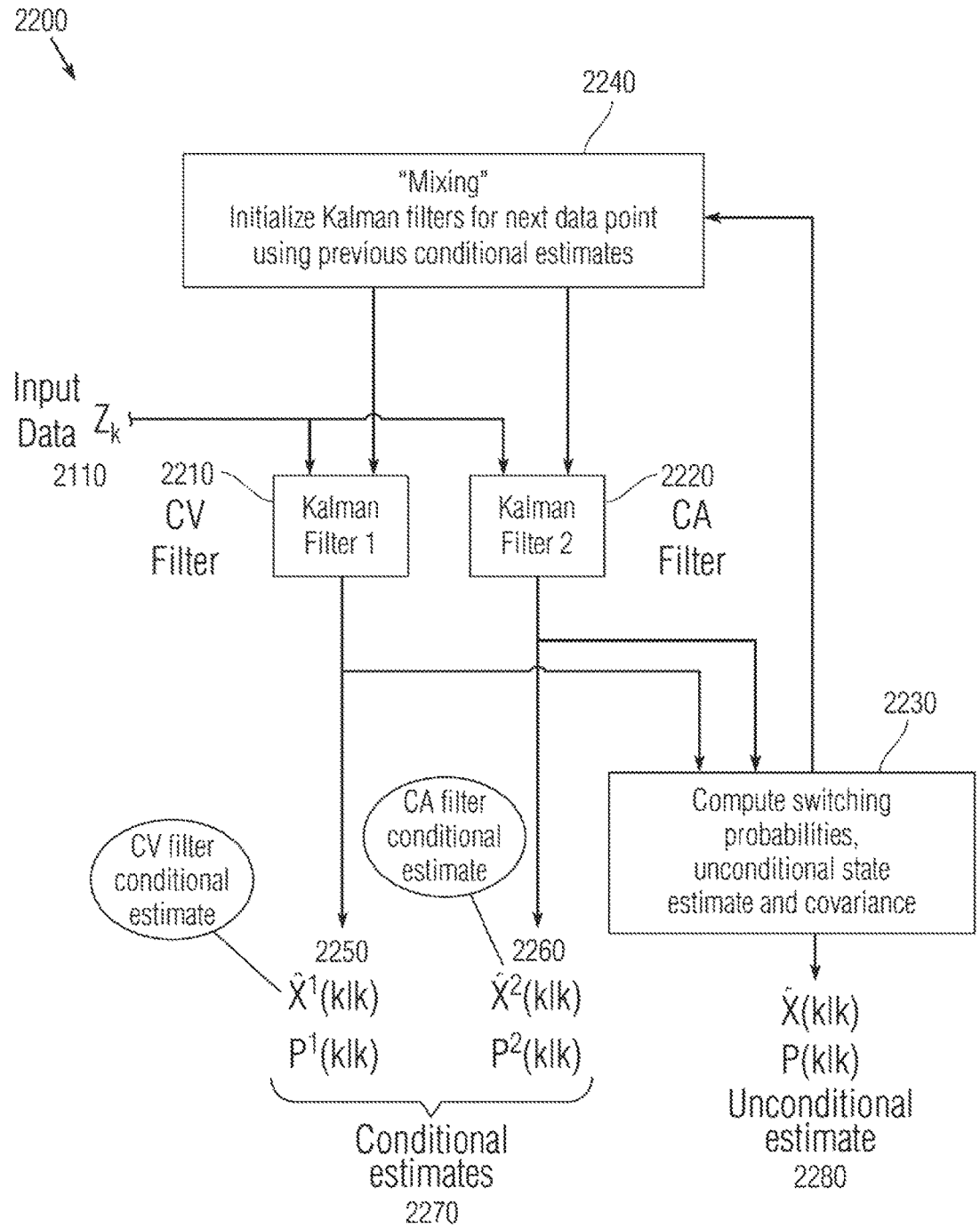
FIG. 22 is a flowchart view of an interacting multiple model (IMM) architecture.

FIG. 22 shows a flow diagram view 2200 of the particular IMM realization of the generic architecture of view 2100. First and second Kalman filters 2210 and 2220 receive input data 2110. The first filter 2210 represents a constant velocity (CV) filter, whereas the second filter 2220 represents a constant acceleration (CA) filter. An IMM switching operation 2230 that computes switching probabilities, state estimate and covariance receives the filter results as inputs, and supplies its results to a mixing operation 2240 to initialize the Kalman filters for the next datum using previous conditional estimates, which are input to the CV and CA filters 2210 and 2220. The results from the CV filter 2210 are provided as a first conditional estimate 2250. The results from the CA filter 2220 are provided as a second conditional estimate 2260. The separate CV and CA filter results represent these conditional estimates 2270. The results from the compute operation 2230 are provided as an unconditional estimate 2280, which is used to compute the RSE metrics, such as eqn. (53), that are shown in the above-described plots.

The process 2200 involves the operation 2230 for "mixing" the conditional estimates to reinitialize each filter 2210 and 2220 before processing the next measurement data. The mathematical details underlying the IMM filter architecture including the "Mixing" 2240 and "Compute switching probabilities" 2230 operations, together with well-documented performance metrics for an IMM filter that tracks a maneuvering target can be found in the excellent Genovese reference. The mathematical details contained in therein will enable an artisan of ordinary skill to replicate and verify the results described in this disclosure.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An angle correction system for removing angle error of a radar system from a measurement vector $x_m$ acquired by an antenna reflected from a target of a radar beam to correct for roll, pitch and yaw angular motion, said system comprising:

a reflection signal acquisition instrument to obtain the measurement vector $x_m$ of the target reflected from the radar beam emitted by the radar system and received by the antenna;

a reference determiner to establish an unstabilized body reference frame at the antenna for the radar system and a stabilized East-North-Up (ENU) reference frame in relation to said body reference frame;

a motion instrument to measure roll, pitch and yaw in said body reference frame as respective angle values (r, p, w);

a vector converter to transform the measurement vector $x_m$ to an unstabilized state vector $x_U$ in said body reference frame;

a calculator to determine:

an unstabilized pre-transform covariance matrix $M_U$ from position variance of said body reference frame, a transform matrix T between said body reference frame and said ENU reference frame, a stabilized data vector $x_S = T x_U$ from said transform matrix and said unstabilized state vector, a measured angle error sensitivity matrix $M_A$ from said angle values, a tri-diagonal angle error component matrix $M_E$ with square values of angle variance of said body reference frame, a total error covariance matrix $P_S = M_A M_E M_A^T + T M_U T^T$;

a Kalman gain matrix for current time k+1 as:
   $K(k+1) = P(k+1|k) H^T [H P(k+1|k) H^T + P_S]^{-1}$, where $P(k+1|k)$ is predicted gain covariance matrix from previous time k to said current time (k+1) and H is measurement Jacobian, and a state estimate $\hat{X}(k+1|k)$ from a dynamic motion model $\Phi$ and a previous estimate at time k;

a gain implementer to apply said Kalman gain matrix to said state estimate for correcting said measurement vector $x_m$ as a covariance correction to the radar system; and a correction implementer to establish said stabilized data vector $x_S$ as a stability correction to the radar system for tracking the target.

2. The system according to claim 1, wherein said stabilized data vector $x_S = T x_U$ is determined as:

$$x_S = \begin{bmatrix} x_S \\ y_S \\ z_S \end{bmatrix} = \begin{bmatrix} T_{11} & T_{12} & T_{13} \\ T_{21} & T_{22} & T_{23} \\ T_{31} & T_{32} & T_{33} \end{bmatrix} \begin{bmatrix} x_U \\ y_U \\ z_U \end{bmatrix} =$$

$$\begin{bmatrix} g_{11} + g_{12} + g_{13} \\ g_{21} + g_{22} + g_{23} \\ g_{31} + g_{32} + g_{33} \end{bmatrix} = \begin{bmatrix} (cosp cosw)x_U + (sinr sinp cosw - cosr sinw)y_U + \\ (cosr sinp cosw + sinr sinw)z_U \\ (cosp sinw)x_U + (sinr sinp sinw + cosr cosw)y_U + \\ (cosr sinp sinw - sinr cosw)z_U \\ (-sinp)x_U + (sinr cosp)y_U + (cosr cosp)z_U \end{bmatrix},$$

where $(g_{11}, g_{12}, \ldots, g_{33})$ represent sensitivity terms.

3. The system according to claim 1, wherein said measured angle error sensitivity matrix is determined as:

$$M_A = \begin{bmatrix} \left( \frac{\partial g_{11}}{\partial r} + \frac{\partial g_{12}}{\partial r} + \frac{\partial g_{13}}{\partial r} \right) & \left( \frac{\partial g_{11}}{\partial p} + \frac{\partial g_{12}}{\partial p} + \frac{\partial g_{13}}{\partial p} \right) & \left( \frac{\partial g_{11}}{\partial w} + \frac{\partial g_{11}}{\partial w} + \frac{\partial g_{13}}{\partial w} \right) \\ \left( \frac{\partial g_{21}}{\partial r} + \frac{\partial g_{22}}{\partial r} + \frac{\partial g_{23}}{\partial r} \right) & \left( \frac{\partial g_{21}}{\partial p} + \frac{\partial g_{22}}{\partial p} + \frac{\partial g_{23}}{\partial p} \right) & \left( \frac{\partial g_{21}}{\partial w} + \frac{\partial g_{22}}{\partial w} + \frac{\partial g_{23}}{\partial w} \right) \\ \left( \frac{\partial g_{31}}{\partial r} + \frac{\partial g_{32}}{\partial r} + \frac{\partial g_{33}}{\partial r} \right) & \left( \frac{\partial g_{31}}{\partial p} + \frac{\partial g_{32}}{\partial p} + \frac{\partial g_{33}}{\partial p} \right) & \left( \frac{\partial g_{31}}{\partial w} + \frac{\partial g_{32}}{\partial w} + \frac{\partial g_{33}}{\partial w} \right) \end{bmatrix},$$

where said $(g_{11}, g_{12}, \ldots, g_{33})$ sensitivity terms are partially differentiated against respective roll, pitch and yaw angles.

4. The system according to claim 1, wherein said angle error component matrix is determined as:

$$M_E = \begin{bmatrix} \sigma_r^2 & 0 & 0 \\ 0 & \sigma_p^2 & 0 \\ 0 & 0 & \sigma_w^2 \end{bmatrix},$$

where $\sigma_r^2$, $\sigma_p^2$, and $\sigma_w^2$ respectively express the variances of roll, pitch and yaw.

* * * * *

UNITED STATES PATENT AND TRADEMARK OFFICE
CERTIFICATE OF CORRECTION

PATENT NO.       : 10,254,393 B2
APPLICATION NO.  : 15/083110
DATED            : April 9, 2019
INVENTOR(S)      : D. Hugh McCabe et al.

Page 1 of 1

It is certified that error appears in the above-identified patent and that said Letters Patent is hereby corrected as shown below:

In the Drawings

Fig. 1: please replace "$Z_{ENU}$(East)" with --$X_{ENU}$(East)-- and "$Z_{ENU}$(North)" with --$Y_{ENU}$(North)-- as shown in the detailed image below:

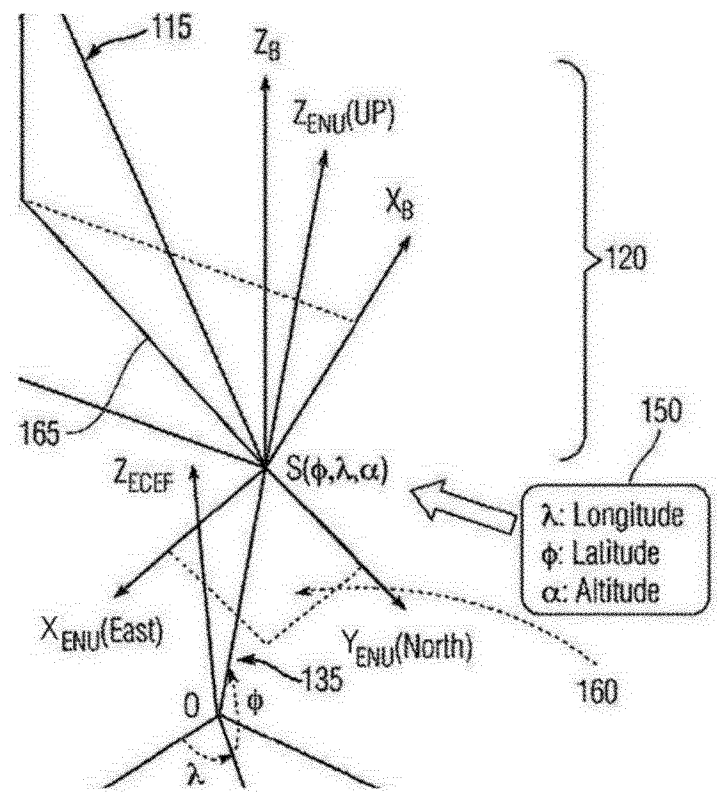

Signed and Sealed this
Twenty-fifth Day of June, 2019

Andrei Iancu
*Director of the United States Patent and Trademark Office*